(12) United States Patent
Nagamasa

(10) Patent No.: US 12,477,248 B2
(45) Date of Patent: Nov. 18, 2025

(54) PHOTOELECTRIC CONVERSION DEVICE, LIGHT DETECTION SYSTEM, MOVABLE BODY, AND METHOD OF CONTROLLING PHOTOELECTRIC CONVERSION DEVICE

(71) Applicant: CANON KABUSHIKI KAISHA, Tokyo (JP)

(72) Inventor: Yoshinobu Nagamasa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 18/637,151

(22) Filed: Apr. 16, 2024

(65) Prior Publication Data

US 2024/0365024 A1  Oct. 31, 2024

(30) Foreign Application Priority Data

Apr. 19, 2023 (JP) .................. 2023-068436

(51) Int. Cl.
*H04N 25/773* (2023.01)
*H04N 25/709* (2023.01)
*H04N 25/78* (2023.01)

(52) U.S. Cl.
CPC ......... *H04N 25/773* (2023.01); *H04N 25/709* (2023.01); *H04N 25/78* (2023.01)

(58) Field of Classification Search
None
See application file for complete search history.

(56) References Cited

U.S. PATENT DOCUMENTS

2023/0071669 A1* 3/2023 Morimoto ............... H10F 39/18

FOREIGN PATENT DOCUMENTS

JP  H0767043 A  3/1995

* cited by examiner

*Primary Examiner* — Mark T Monk
(74) *Attorney, Agent, or Firm* — Canon U.S.A., Inc. IP Division

(57) ABSTRACT

A photoelectric conversion device includes a detector, a switch, a first circuit, a second circuit, a counter, and a selector. The detector generates change in voltage by current based on incident photons. The switch is between the detector and a node. The first circuit generates a first detection signal based on the change in response to the photon in the detector during a period when the switch is in the ON state. The second circuit generates a second detection signal based on the change in the detector during periods when the switch is in the ON and OFF states. The counter counts the signal to output a count value. The selector selects one of the first and second detection signals generated by the one of the first and second circuits and output a selected detection signal to the counter.

16 Claims, 20 Drawing Sheets

PHOTOELECTRIC CONVERSION DEVICE, LIGHT DETECTION SYSTEM, MOVABLE BODY, AND METHOD OF CONTROLLING PHOTOELECTRIC CONVERSION DEVICE

BACKGROUND

Field

The present disclosure relates to a photoelectric conversion device, a light detection system, a movable body, and a method of controlling a photoelectric conversion device.

Description of the Related Art

Japanese Patent Application Laid-Open No. H07-67043 discloses a solid-state imaging device in which a single photon avalanche diode (SPAD) is charged via a switching means controlled by a pulse signal having a given period to count the number of photons incident on the SPAD.

According to the solid-state imaging device described in Japanese Patent Application Laid-Open No. H07-67043, however, the quality of captured images may not be sufficient.

SUMMARY

According to one aspect of the present disclosure, a photoelectric conversion device includes a detector, a switch, a first circuit, a second circuit, a counter; and a selector. The detector generates a change in voltage by a current generated in response to an incident photon. The switch is arranged between the detector and a power node. The switch supplies a current for the detector from the power node to change a voltage of the detector to a predetermined bias voltage when being in an ON state. The switch cuts off the current supplied from the power node to the detector when being in an OFF state. The first circuit generates a first detection signal based on the change in voltage in response to the incident photon in the detector during a period when the switch is in the ON state. The second circuit generates a second detection signal based on the change in voltage in the detector during periods when the switch is in the ON state and in the OFF state. The counter counts the detection signal to output a count value. The selector selects the first detection signal generated by the first circuit or the second detection signal generated by the second circuit and output a selected detection signal to the counter.

Further features of the present disclosure will become apparent from the following description of exemplary embodiments with reference to the attached drawings.

DESCRIPTION OF THE EMBODIMENTS

Figure 1:
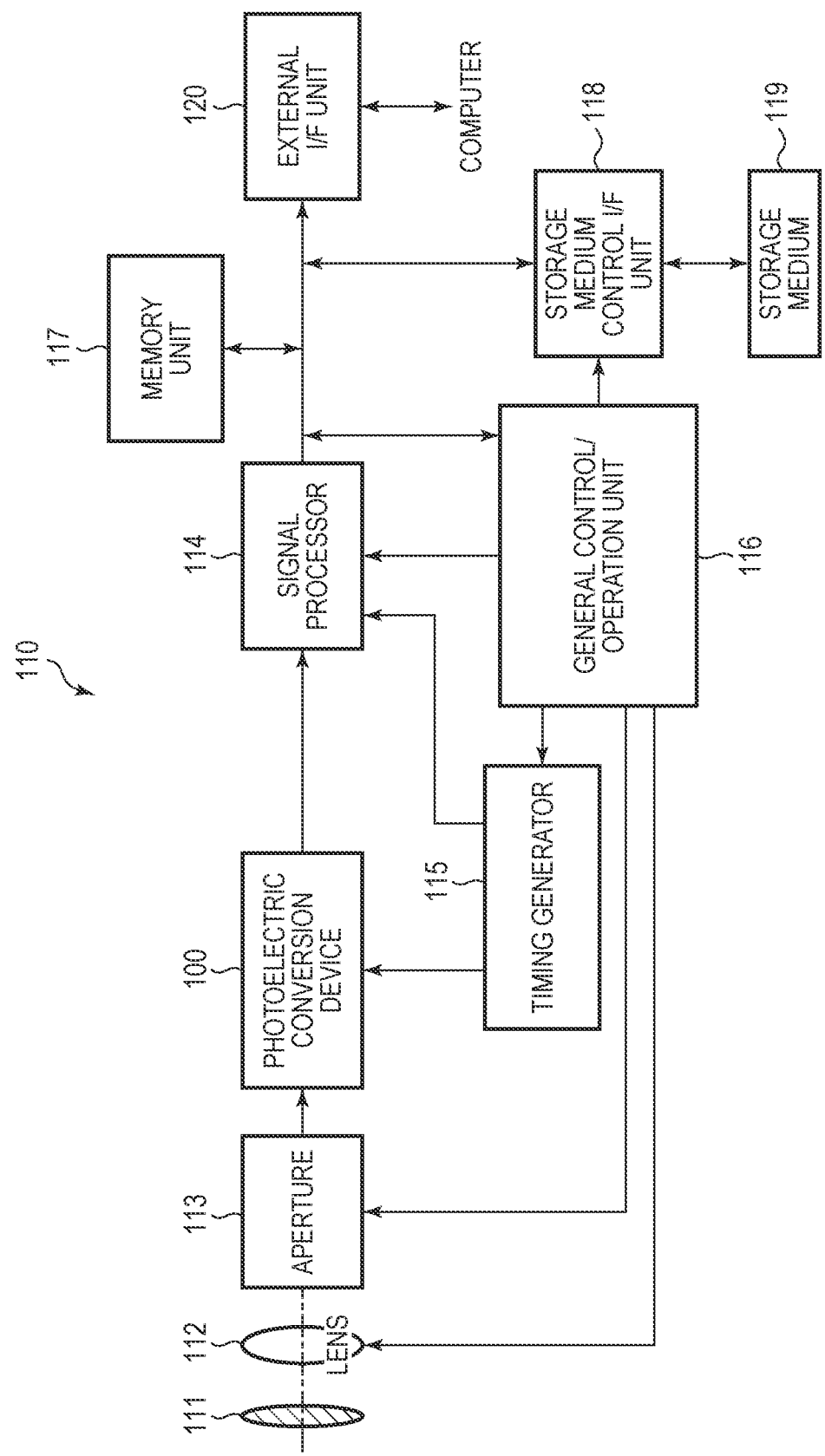
FIG. 1 illustrates a block diagram of the imaging system according to the first embodiment.

Preferred embodiments of the present disclosure will now be described in detail with reference to the accompanying drawings. In the drawings, elements having common functions are denoted by the same reference symbols, and overlapping descriptions may be omitted or simplified.

First Embodiment

FIG. 1 is a block diagram of an imaging system 110 according to the first embodiment. The imaging system 110 is an aspect of a light detection system. The imaging system 110 includes a barrier 111, a lens 112, an aperture 113, a photoelectric conversion device 100, a signal processor 114, a timing generator 115, a general control and operation unit 116, a memory unit 117, a storage medium control I/F unit 118, a storage medium 119, and an external I/F unit 120. The barrier 111 protects the lens, and the lens 112 forms an optical image of a subject on the photoelectric conversion device 100. The aperture 113 varies the amount of light passing through the lens 112. The photoelectric conversion device 100 converts an optical image formed by the lens 112 into image data. The signal processor 114 compresses data and executes various corrections for the imaging data output from the photoelectric conversion device 100. For example, the signal processor 114 performs pixel interpolation processing, color conversion processing, and the like based on pixel signals output from the photoelectric conversion device 100. The signal processor 114 generates digital image data in RGB format, YUV format, or the like based on the pixel signals. Further, the signal processor 114 generates histogram information based on information output from the photoelectric conversion device 100. The histogram information generated by the signal processor 114 may be, for example, the number of pixels that output respective pixel values in a predetermined frame. The histogram information will be described later.

The timing generator 115 outputs various timing signals to the photoelectric conversion device 100 and the signal processor 114. The general control and operation unit 116 may include an image signal processor (ISP), an application specific integrated circuit (ASIC), a programmable integrated circuit (FPGA), etc. The general control and operation unit 116 controls the entire imaging system 110. For example, the general control and operation unit 116 may control the operation mode of the photoelectric conversion device 100 based on the histogram information generated by the signal processor 114. The memory unit 117 temporarily stores image data. The storage medium control I/F unit 118 is an interface for recording image data in the storage medium 119, and reading the image data from the storage medium 119. The storage medium 119 is a detachable recording medium such as a semiconductor memory for recording or reading captured image data. The external I/F unit 120 is an interface for communicating with an external computer or the like. The timing signals may be input from the outside of the imaging system 110, and the imaging system 110 may include at least the photoelectric conversion device 100 and the signal processor 114 that processes the image signal output from the photoelectric conversion device 100.

In the present embodiment, the photoelectric conversion device 100 and the signal processor 114 are provided on different semiconductor substrates, but the photoelectric conversion device 100 and the signal processor 114 may be formed on the same semiconductor substrate. Examples of the imaging system 110 include a digital still camera, a digital camcorder, a camera head, a copying machine, a facsimile, a mobile phone, a vehicle-mounted camera, an observation satellite, and a monitoring camera.

Each pixel may include a first photoelectric conversion unit and a second photoelectric conversion unit. The signal processor 114 processes the pixel signal that is based on the charge generated in the first photoelectric conversion unit and the pixel signal that is based on the charge generated in the second photoelectric conversion unit. The signal processor 114 acquires distance information from the imaging system 110 to a subject or an object.

Figure 2:
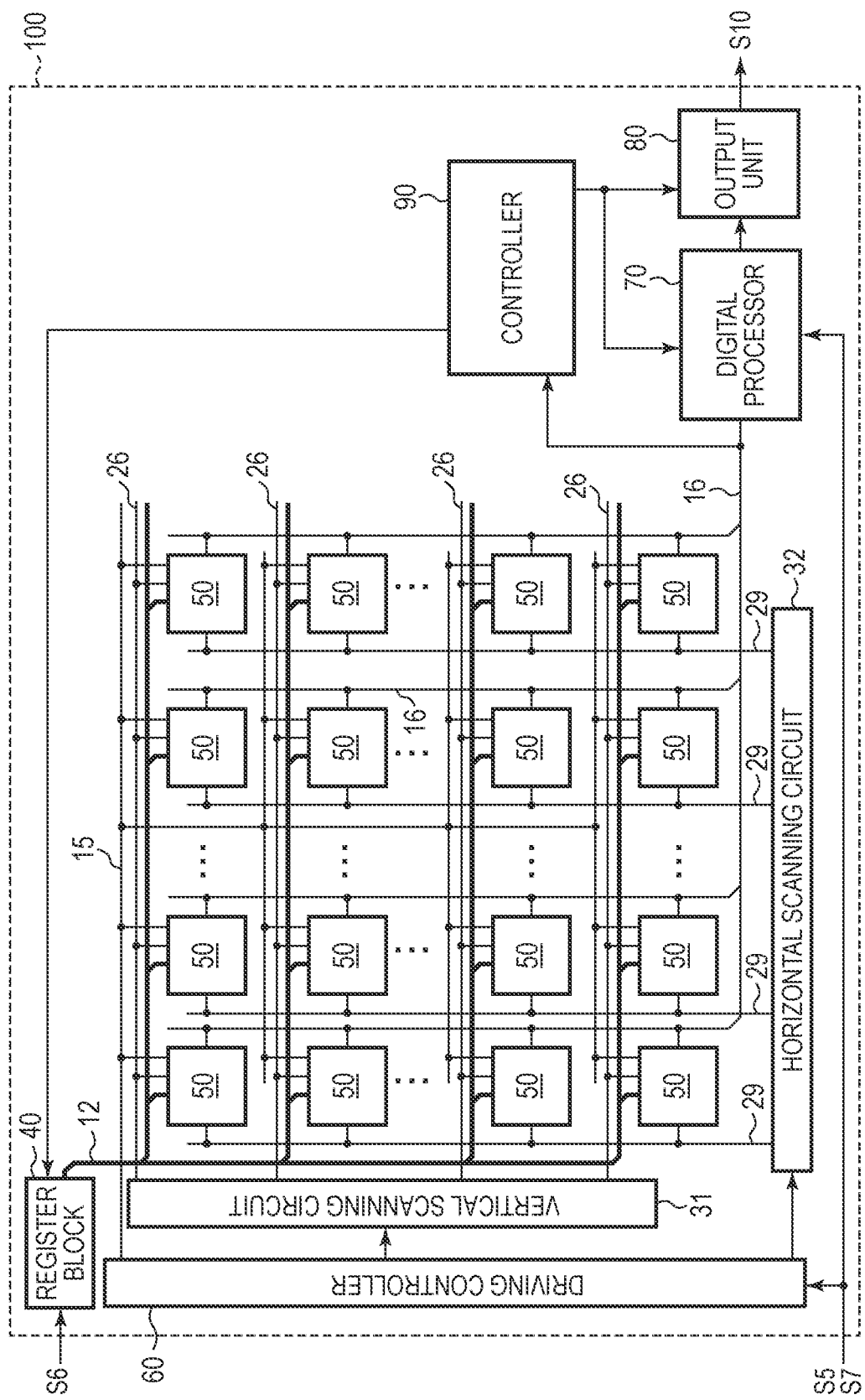
FIG. 2 illustrates a block diagram of the photoelectric conversion device according to the first embodiment.

FIG. 2 is a block diagram of the photoelectric conversion device 100 according to the first embodiment. The photoelectric conversion device 100 includes a plurality of pixel units 50, a driving controller 60, a vertical scanning circuit 31, a horizontal scanning circuit 32, a register block 40, a digital processor 70, an output unit 80, and a controller 90.

The pixel unit 50 outputs a pixel signal corresponding to the incident light through an output line 16. The plurality of pixel units 50 (a plurality of pixels) are arranged in a matrix in a pixel region of the photoelectric conversion device 100. The number of the pixel units 50 is not particularly limited. For example, when used for an imaging camera, there may be 1920 pixel units 50 in the horizontal direction and there may be 1080 pixel units 50 in the vertical direction to form a matrix. When used in a line scan sensor, the pixel units 50 may be arranged in one row and multiple columns. The detailed configuration of the pixel unit 50 will be described later.

The driving controller 60 receives a timing signal S5 from the general control and operation unit 116 via the timing generator 115. The driving controller 60 transmits a driving signal to the vertical scanning circuit 31 and the horizontal scanning circuit 32 based on the timing signal. The vertical scanning circuit 31 and the horizontal scanning circuit 32 are controlled by the driving signal. Further, the driving controller 60 transmits a periodic signal S1 to the pixel unit 50 via a periodic signal line 15 based on the timing signal. A single photon avalanche diode (SPAD) 510 of the pixel unit 50 is charged based on the periodic signal S1. The SPAD 510 will be described later. The driving controller 60 also supplies other control signals (not shown) to control the overall operation of the photoelectric conversion device 100. The driving controller 60 may be driven using a clock from a phase locked loop (PLL) circuit or the like inside the photoelectric conversion device 100.

The vertical scanning circuit 31 receives the driving signal from the driving controller 60, and supplies a scanning signal S2 to the pixel units 50 of each row via a scanning line 26. The vertical scanning circuit 31 sequentially scans the pixel units 50 in units of rows. That is, the vertical scanning circuit 31 selects a pixel row to output a pixel signal. The vertical scanning circuit 31 may be configured using a logic circuit such as a shift register or an address decoder.

The horizontal scanning circuit 32 receives the driving signal from the driving controller 60, and supplies a scanning signal S3 to the pixel units 50 of each column via a signal line 29. The horizontal scanning circuit 32 sequentially scans the pixel units 50 in units of columns. That is, the horizontal scanning circuit 32 selects a pixel column to output a pixel signal. The horizontal scanning circuit 32 may be configured using a logic circuit such as a shift register or an address decoder.

The register block 40 receives a mode signal S6 for setting an operation mode of the pixel units 50 from the general control and operation unit 116 via the timing generator 115. The register block 40 supplies a setting signal S4 to the pixel units 50 via a setting signal line 12 based on the mode signal S6. The register block 40 may hold various setting parameters for the light detecting operation. For example, the register block 40 may store and transmit a timing setting of the light detecting operation, conditions for driving the pixels, setting of the driving capability of the analog driving portion in the photoelectric conversion device, and the like. As data communications for transmitting setting information, serial communication means such as I2C (Inter-Integrated Circuit), SPI (Serial Peripheral Interface), or other communication means may be used.

The digital processor 70 receives a timing signal S7 from the general control and operation unit 116 via the timing generator 115. The digital processor 70 receives pixel signals from the pixel units 50 via the output lines 16. The digital processor 70 performs various digital signal processing such as offset processing and digital gain processing on the pixel signals based on the timing signal S7.

The output unit 80 receives the pixel signals subjected to the signal processing from the digital processor 70. The output unit 80 transmits the pixel signal received from the digital processor 70 to the signal processor 114 as an output signal S10. The output unit 80 may include a serializer that converts parallel data into serial data, a low voltage differential signal (LVDS) transmitter, and the like. The output unit 80 may include parallel output means or the like instead of the serializer.

The controller 90 receives the pixel signals from the pixel units 50 via the output lines 16. The controller 90 transmits a control signal for reducing power consumption based on the pixel signals to the register block 40, the driving controller 60, and the digital processor 70. Each of the register block 40, the driving controller 60, and the digital processor 70 limits predetermined functions and operation based on the control signal from the controller 90.

Figure 3:
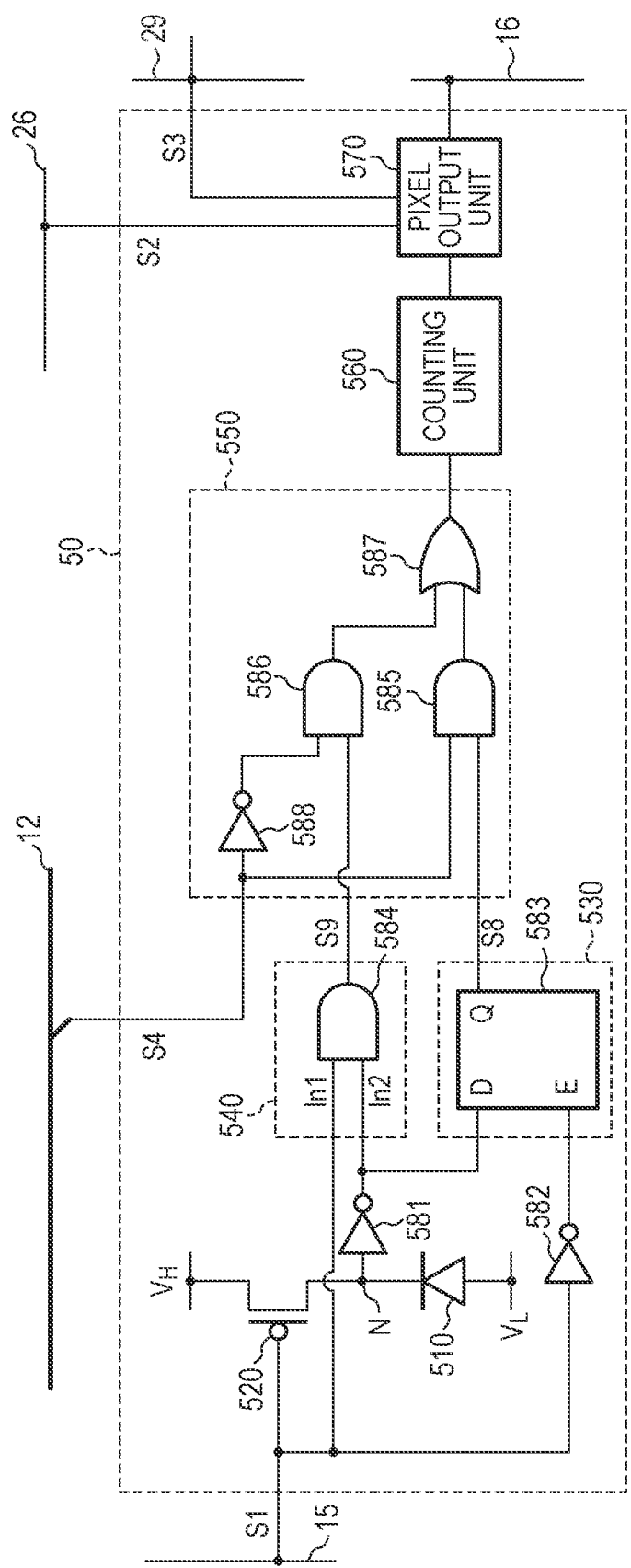
FIG. 3 illustrates a circuit diagram of the pixel unit according to the first embodiment.

FIG. 3 is a circuit diagram of the pixel unit 50 according to the first embodiment. The pixel unit 50 includes the SPAD 510, a switch unit (switch) 520, a circuit 530 (first circuit), a circuit 540 (second circuit), a selector 550, a counting unit (counter) 560, and a pixel output unit 570.

The SPAD 510 is a photodiode working as a detector that detects the incidence of photons on the pixel unit 50. A cathode of the SPAD 510 is connected to an input node of a NOT gate 581 via a node N. An anode of the SPAD 510 is connected to a node of a voltage source that supplies a voltage VL. The operation of the SPAD 510 will be described later. Although the SPAD 510 is described as a single photon avalanche diode in the present embodiment, an avalanche photodiode (APD) described later may be used.

The switch 520 connects and disconnects the node (power supply node) of the voltage source for supplying the voltage VH and the SPAD 510. The switch 520 of the present embodiment is configured using a MOS transistor. A gate of the switch 520 is connected to the periodic signal line 15. A source of the switch 520 is connected to the node of the voltage source that supplies a voltage VH. A drain of the switch 520 is connected to the cathode of the SPAD 510 and the input node of the NOT gate 581 via the node N. The periodic signal S1 is supplied to the gate of the switch 520 via the periodic signal line 15. The periodic signal S1 may be a rectangular wave having a predetermined amplitude and pulse width. While the periodic signal S1 is at a low level, the switch 520 is turned on, the voltage source and the SPAD 510 are electrically connected, and a current is supplied from the voltage source to the SPAD 510 through the switch 520. Therefore, the SPAD 510 is charged while the periodic signal S1 is at a low level, and the potential of the node N rises until a predetermined bias voltage is reached. While the periodic signal S1 is at the high level, the switch 520 is turned off, the voltage source and the SPAD 510 are electrically disconnected, and the supply of current from the voltage source to the SPAD 510 is cut off. Therefore, the SPAD 510 is not charged while the periodic signal S1 is at the high level, and the potential of the node N is maintained at the potential of when the switch 520 is switched from a turned-on state (ON state) to a turned-off state (OFF state). The voltage source for supplying the voltage VH and the voltage VL supplies a reverse bias voltage necessary for the SPAD 510 to perform the avalanche amplification operation via the switch 520. When a photon enters the SPAD 510, avalanche multiplication occurs in the SPAD 510, and the potential of the node N decreases. That is, the potential of the node N (the voltage of the SPAD 510) is changed by the current generated in response to the input of the photon to the SPAD 510.

The circuit 530 generates a detection signal S8 (first detection signal) indicating detection of a photon in the SPAD 510 based on the periodic signal S1 and the potential of the node N. The circuit 530 includes a D-latch circuit 583.

The D-latch circuit 583 of the circuit 530 includes an input node D, a control node E, and an output node Q. A signal from the SPAD 510 based on the potential of the node N is input to the input node D via the NOT gate 581. Specifically, when a photon enters the SPAD 510, a high-level signal is input to the input node D in response to the node N transitioning to a low potential. When no photon enters the SPAD 510, a low-level signal is input to the input node D in response to the node N transitioning to a high potential. That is, the circuit 530 generates a detection signal based on a voltage change of the SPAD 510 due to the incidence of photon. The periodic signal S1 is input to the control node E through the NOT gate 582. The periodic signal S1 is input to the switch 520 and the circuit 530 as a common control signal. When the periodic signal S1 is at a low level, a high-level signal is input to the control node E. When the periodic signal S1 is at a high level, a low-level signal is input to the control node E. The output node Q outputs the detection signal S8 based on the input signal to the input node D and the control node E. Specifically, while a high-level signal is input to the control node E, a signal synchronized with the input signal to the input node D is output from the output node Q to the selector 550 as the detection signal S8. On the other hand, while a low-level signal is input to the control node E, a signal that has been output from the output node Q immediately before the periodic signal S1 is switched from a high level to a low level is output from the output node Q to the selector 550 as the detection signal S8. That is, while a low-level signal is input to the control node E, a constant detection signal S8 is generated from the output node Q independently of an input signal to the input node D.

The circuit 540 outputs a detection signal S9 (second detection signal) indicating detection of photon in the SPAD 510 based on the periodic signal S1 and the potential of the node N. The circuit 540 includes an AND gate 584.

The periodic signal S1 is input to one input node In1 of the AND gate 584. That is, the periodic signal S1 is input to the switch 520 and the circuit 540 as a common control signal. Here, the periodic signal S1 input to the input node In1 is opposite in phase to the signal input to the control node E of the D-latch circuit 583 at the same time. The signal from the SPAD 510 based on the potential of the node N is input to the other input node In2 of the AND gate 584 via the NOT gate 581. That is, a signal having the same phase as the input signal to the input node D of the D-latch circuit 583 is input to the AND gate 584. The circuit 540 performs an AND operation on the signal input to the AND gate 584. The circuit 540 outputs a result of the calculation to the selector 550 as the detection signal S9.

The selector 550 selects the detection signals S8 and S9 based on the setting signal S4. Specifically, the selector 550 includes an AND gate 585, an AND gate 586, an OR gate 587, and a NOT gate 588. The selector 550 receives the detection signal S8 from the circuit 530 and the detection signal S9 from the circuit 540. The selector 550 receives the setting signal S4 from the register block 40 via the setting signal line 12. The detection signal S8 is input to one input node of the AND gate 585. The detection signal S9 is input to one input node of the AND gate 586.

The setting signal S4 is input to the other input node of the AND gate 585. The setting signal S4 is input to the other input node of the AND gate 586 via the NOT gate 588.

The AND gate 585 performs an AND operation on the input signal to output a result of the operation to one input node of the OR gate 587. The AND gate 586 performs an AND operation on the input signal to output a result of the operation to the other input node of the OR gate 587. The OR gate 587 performs an OR operation on the input signal to output a result of the operation to the counter 560 as an output signal of the selector 550.

According to the present embodiment, when the setting signal S4 is at a high level, a high-level signal is input to the AND gate 585, and a low-level signal is input to the AND gate 586. Therefore, while the setting signal S4 is at a high level, the detection signal S8 from the circuit 530 is selected by the selector 550. When the selected detection signal S8 is at a high level, the selector 550 outputs a high-level signal through the OR gate 587. When the selected detection signal S8 is at a low level, the selector 550 outputs a low-level signal through the OR gate 587.

On the other hand, when the setting signal S4 is at a low level, a low-level signal is input to the AND gate 585, and a high-level signal is input to the AND gate 586. Therefore, while the setting signal S4 is at a low level, the detection signal S9 from the circuit 540 is selected by the selector 550. When the selected detection signal S9 is at a high level, the selector 550 outputs a high-level signal through the OR gate 587. When the selected detection signal S9 is at a low level, the selector 550 outputs a low-level signal through the OR gate 587. In the present embodiment, the selector 550 selects the detection signals S8 and S9 using the AND gate and the OR gate. However, the selector 550 may select the detection signals S8 and S9 using other logic gates or other signal selection means than the AND gate and the OR gate.

The counter 560 counts a detection signal indicating the detection of the incidence of photon on the SPAD 510, and outputs a count result as a count value. Specifically, the counter 560 samples the selected detection signal S8 or the detection signal S9 at the timing when the periodic signal S1 transitions from a high level to a low level. When the detection signal S8 or the detection signal S9 is at a high level at the sampling timing, the counter 560 increments the count value of photons. When the detection signal S8 or the detection signal S9 is at a low level at the sampling timing, the counter 560 maintains the count value of the photons. The counter 560 performs sampling processing of the detection signal and increment processing of the count value of the photons for a predetermined period (for example, one frame period). After a predetermined period (for example, one frame period) has elapsed, the counter 560 outputs an integrated count value as a pixel signal to the pixel output unit 570. The counter 560 initializes the count value after outputting the count value.

The pixel output unit 570 receives the count value from the counter 560. When the pixel unit 50 is selected by the scanning signal S2 transmitted from the vertical scanning circuit 31 and by the scanning signal S3 transmitted from the horizontal scanning circuit 32, the pixel output unit 570 outputs the count value as a pixel signal to the digital processor 70 and the controller 90 via the output line 16. The count value output from the pixel output unit 570 corresponds to the pixel value of the pixel unit 50.

Figure 4:
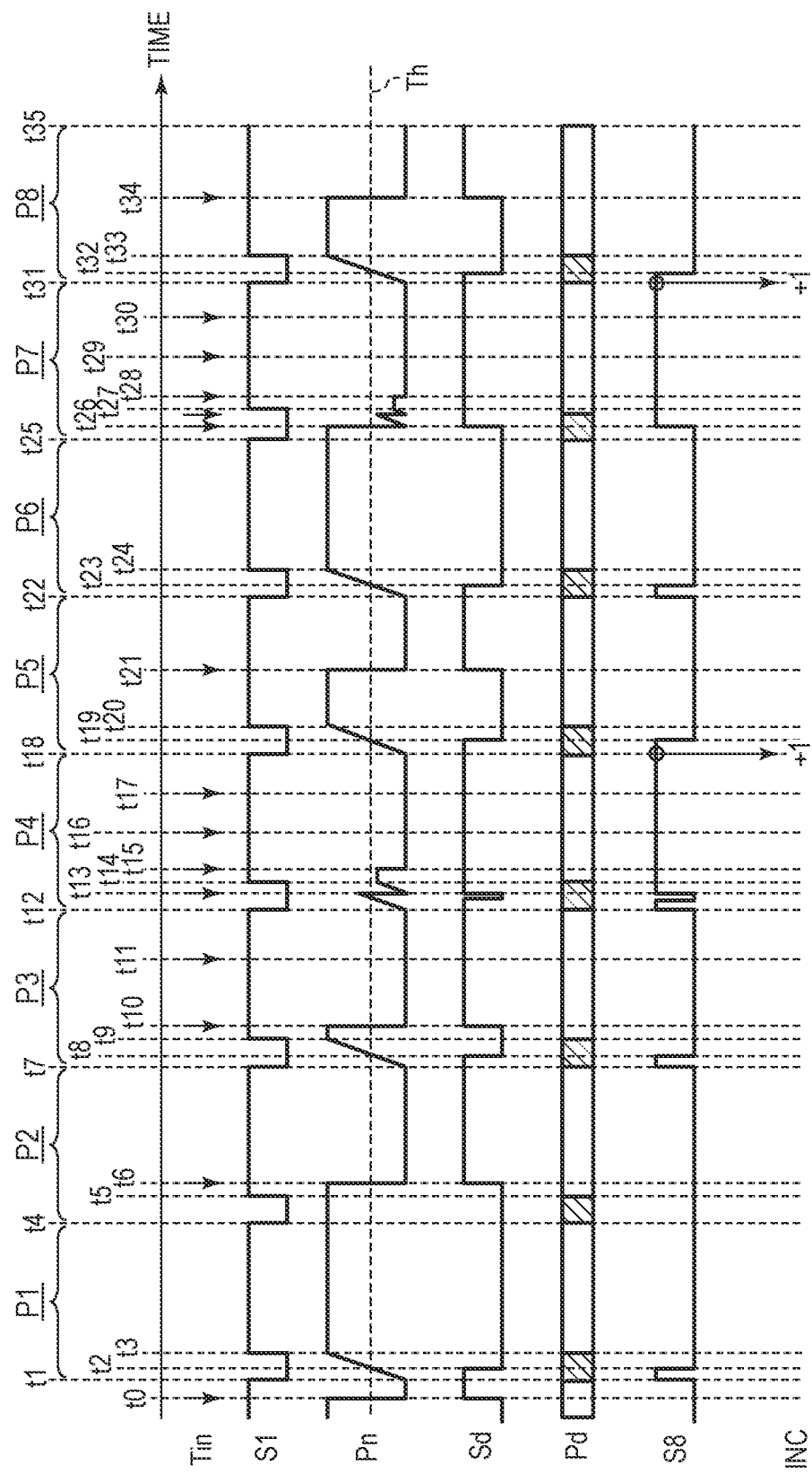
FIG. 4 illustrates a timing chart showing the operation of a counting unit according to the first embodiment.

FIG. 4 is a timing chart showing the operation of the counter according to the first embodiment. Each of periods P1 to P8 corresponds to one period of the periodic signal S1. In the periods P1 to P8, the setting signal S4 having a high-level is input to the pixel unit 50. That is, in the periods P1 to P8, the detection signal S8 from the circuit 530 is selected by the selector 550. Accordingly, the detection signal S8 is sampled in each of the periods P1 to P8 shown in FIG. 4. FIG. 4 shows timing Tin at which a photon is incident on the SPAD 510 in the periods P1 to P8, timing of the periodic signal S1 input to the gate of the switch 520; a potential Pn of the node N, an input signal Sd to the input node D of the D-latch circuit 583, a photon detection period Pd in the periods P1 to P8, the detection signal S8 transmitted from the circuit 530, and timing of the increment operation INC by the counter 560.

At time t0 prior to the period P1, a photon enters the SPAD 510. The incidence of photon causes avalanche multiplication in the SPAD 510. In response to the avalanche multiplication operation of the SPAD 510, the potential Pn of the node N becomes lower than a logic threshold Th, and the input signal Sd to the input node D of the D-latch circuit 583 transitions from a low level to a high level. On the other hand, since the periodic signal S1 is at a high level at time to, a control signal Se having a low-level is input to the control node E of the D-latch circuit 583 via the NOT gate 582. Therefore, the detection signal S8 does not change in response to the input signal Sd and remains at a low level.

Since the periodic signal S1 is at a high level from the time t0 to the start time t1 of the period P1, the switch 520 is maintained in a turned-off state (OFF state). Therefore, during the period from the time t0 to the time t1, the SPAD 510 is not charged, the potential Pn and the detection signal S8 are maintained at a low level, and the input signal Sd is maintained at a high level.

At time t1, the periodic signal S1 transitions from a high level to a low level, and the switch 520 switches from the OFF state to a turned-on state (ON state). When the switch 520 is turned on, charging of the SPAD 510 is started. At time t1, the control signal Se having a high-level is input to the control node E of the D-latch circuit 583. As a result, the detection signal S8 transitions from a low level to a high level in response to the input signal Sd having a high level. Further, at time t1, an increment process is executed in the counter 560. The detection signal S8 output from the circuit 530 immediately before the time t1 is at a low level. Therefore, the counter 560 does not increment the count value.

Since the periodic signal S1 is maintained at a low level during the period from the time t1 to the time t2, the switch 520 is maintained in the ON state and the control signal Se is maintained at a high level. The SPAD 510 is charged during the period from time t1 to time t2. However, since the potential Pn does not exceed the logic threshold Th during the period from the time t1 to the time t2, the input signal Sd is maintained at a high level. Therefore, during the period from the time t1 to the time t2, the detection signal S8 is maintained at a high level according to the input signal Sd having a high level.

At time t2, the potential Pn exceeds the logic threshold Th, and the input signal Sd transitions from a high level to a low level. Since the control signal Se is at a high level at time t2, the detection signal S8 transitions from a high level to a low level according to the input signal Sd.

Since the periodic signal S1 is maintained at a low level during the period from the time t2 to the time t3, the switch 520 is maintained in the ON state and the control signal Se is maintained at a high level. The SPAD 510 is charged during the period from time t2 to time t3. The input signal Sd is maintained at a low level. Therefore, during the period from the time t2 to the time t3, the detection signal S8 is maintained at a low level according to the input signal Sd having a low-level.

At time t3, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops. Further, the control signal Se transitions from a high level to a low level at time t3.

Since the periodic signal S1 is maintained at a high level during the period from the time t3 to the time t4, the switch 520 is maintained in the OFF state. Therefore, the SPAD 510 is not charged during the period from the time t3 to the time t4, the potential Pn is maintained to the potential at the time t3, and the input signal Sd is maintained at a low level. Since the control signal Se is maintained at a low level during the period from the time t3 to the time t4, the detection signal S8 having a low-level continues to be output in response to the input signal Sd having a low-level immediately before the time t3.

At time t4, the period P1 ends, and at the same time, the period P2 starts. At time t4, the periodic signal S1 transitions from a high level to a low level, and the switch 520 switches from the OFF state to the ON state. At time t4, the control signal Se having a high-level is input to the control node E of the D-latch circuit 583. Therefore, the detection signal S8 is maintained at a low level according to the input signal Sd having a low-level. At time t4, the counter 560 performs increment processing. The detection signal S8 output from the circuit 530 immediately before the time t4 is at a low level. Therefore, the counter 560 does not increment the count value.

Since the periodic signal S1 is maintained at a low level during the period from the time t4 to the time t5, the switch 520 is maintained in the ON state. Thus, the SPAD 510 may be charged during the period from the time t4 to the time t5, but the SPAD 510 does not perform an avalanche multiplication operation during the period P1. Therefore, the potential Pn is maintained to the potential at the time t4 during the period from the time t4 to the time t5. Therefore, the input signal Sd is maintained at a low level. As a result, the detection signal S8 is maintained at a low level in response to the input signal Sd having a low-level during the period from the time t4 to the time t5.

At time t5, the periodic signal S1 transitions from a low level to a high level, and the switch 520 switches from the ON state to the OFF state. Further, the control signal Se transitions from a high level to a low level at time t5.

Since the periodic signal S1 is maintained at a high level during the period from the time t5 to the time t6, the switch 520 is maintained in the OFF state. Therefore, the SPAD 510 is not charged during the period from the time t5 to the time t6, and the potential Pn is maintained to the potential at the time t5. Since the control signal Se is at a low level, the detection signal S8 outputs a low-level signal in response to the input signal Sd having a low-level immediately before the time t5.

At time t6, a photon enters the SPAD 510. The incidence of photons causes avalanche multiplication in the SPAD 510. In response to the avalanche multiplication operation of the SPAD 510, the potential Pn becomes lower than the logic threshold Th, and the input signal Sd transitions from a low level to a high level. On the other hand, since the periodic signal S1 is at a high level at time t6, the control signal Se having a low-level is input to the control node E of the D-latch circuit 583. Therefore, the detection signal S8 does not change in response to the input signal Sd and remains at a low level.

Since the periodic signal S1 is maintained at a high level during the period from the time t6 to the time t7, the switch 520 is maintained in the OFF state. Therefore, the SPAD 510 is not charged during the period from the time t6 to the time t7, the potential Pn is maintained to the potential at the time t6, and the input signal Sd is maintained at a high level. Since the control signal Se is maintained at a low level during the period from the time t6 to the time t7, the detection signal S8 having a low-level continues to be output in response to the input signal Sd having a low level immediately before the time t5.

At time t7, the period P2 ends, and at the same time, the period P3 starts. At time t7, the periodic signal S1 transitions from a high level to a low level, and the switch 520 switches from the OFF state to the ON state. When the switch 520 is turned on, charging of the SPAD 510 is started. At time t7, the control signal Se having a high level is input to the control node E of the D-latch circuit 583. Accordingly, the detection signal S8 transitions from a low level to a high level in response to the input signal Sd having a high level. At time t7, the counter 560 performs increment processing. The detection signal S8 output from the circuit 530 immediately before the time t7 is at a low level. Therefore, the counter 560 does not increment the count value.

Since the periodic signal S1 is maintained at a low level during the period from the time t7 to the time t8, the switch 520 is maintained in the ON state and the control signal Se is maintained at a high level. The SPAD 510 is charged during a period from time t7 to time t8. However, since the potential Pn does not exceed the logic threshold Th during the period from the time t7 to the time t8, the input signal Sd is maintained at a high level. Therefore, during the period from the time t7 to the time t8, the detection signal S8 is maintained at a high level according to the input signal Sd having a high level.

At time t8, the potential Pn exceeds the logic threshold Th, and the input signal Sd transitions from a high level to a low level. Since the control signal Se is at a high level at time t8, the detection signal S8 transitions from a high level to a low level according to the input signal Sd.

Since the periodic signal S1 is maintained at a low level during the period from the time t8 to the time t9, the switch 520 is maintained in the ON state and the control signal Se is maintained at a high level. The SPAD 510 is charged during a period from time t8 to time t9. The input signal Sd is maintained at a low level. Therefore, during the period from the time t8 to the time t9, the detection signal S8 is maintained at a low level in response to the input signal Sd having a low-level.

At time t9, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops. Further, the control signal Se transitions from a high level to a low level at time t9.

Since the periodic signal S1 is maintained at a high level during the period from the time t9 to the time t10, the switch 520 is maintained in the OFF state. Therefore, the SPAD 510 is not charged during the period from the time t9 to the time t10, the potential Pn is maintained to the potential at the time t9, and the input signal Sd is maintained at a low level. Since the control signal Se is maintained at a low level during the period from the time t9 to the time t10, the detection signal S8 having a low level continues to be output in response to the input signal Sd having a low level immediately before the time t9.

At time t10, a photon enters the SPAD 510. The incidence of photons causes avalanche multiplication in the SPAD 510. In response to the avalanche multiplication operation of the SPAD 510, the potential Pn becomes lower than the logic threshold Th, and the input signal Sd transitions from a low level to a high level. On the other hand, since the periodic signal S1 is at a high level at time t10, a control signal Se having a low level is input to the control node E of the D-latch circuit 583. Therefore, the detection signal S8 does not change in response to the input signal Sd and remains at a low level.

Since the periodic signal S1 is maintained at a high level during the period from time t10 to time t12, the switch 520 is maintained in the OFF state. Therefore, the SPAD 510 is not charged during the period from the time t10 to the time t12, the potential Pn is maintained to the potential at the time t10, and the input signal Sd is maintained at a high level. Since the control signal Se is maintained at a low level during the period from time t10 to time t12, the detection signal S8 having a low level continues to be output in response to the input signal Sd having a low level immediately before time t9.

At time t11, a photon enters the SPAD 510. However, the SPAD 510 has already performed the avalanche multiplication operation by the incidence of photon at time t10. Therefore, the potential Pn, the input signal Sd, and the detection signal S8 do not change due to the incidence of photon at the time t11.

At time t12, the period P3 ends, and at the same time, the period P4 starts. At time t12, the periodic signal S1 transitions from a high level to a low level, and the switch 520 switches from the OFF state to the ON state. When the switch 520 is turned on, charging of the SPAD 510 is started. At time t12, the control signal Se having a high-level is input to the control node E of the D-latch circuit 583. As a result, the detection signal S8 transitions from a low level to a high level in response to the input signal Sd having a high level. At time t12, the counter 560 performs increment processing. The detection signal S8 output from the circuit 530 immediately before the time t12 is at a low level. Therefore, the counter 560 does not increment the count value.

Since the periodic signal S1 is maintained at a low level during the period from the time t12 to the time t13, the switch 520 is maintained in the ON state and the control signal Se is maintained at a high level. The SPAD 510 is charged during a period from the time t12 to the time t13. Before the time t13 is reached, the potential Pn exceeds the logic threshold Th, and the input signal Sd transitions from a high level to a low level. Since the control signal Se is at a high level during the period from the time t12 to the time t13, the detection signal S8 transitions from a high level to a low level according to the input signal Sd.

At time t13, a photon enters the SPAD 510. The incidence of photon causes the avalanche multiplication in the SPAD 510. In response to the avalanche multiplication operation of the SPAD 510, the potential Pn becomes lower than the logic threshold Th, and the input signal Sd transitions from a low level to a high level. Since the periodic signal S1 is at a low level at time t13, the control signal Se having a high-level is input to the control node E of the D-latch circuit 583. As a result, the detection signal S8 transitions from a low level to a high level in response to the input signal Sd having a high level.

Since the periodic signal S1 is maintained at a low level during the period from the time t13 to the time t14, the switch 520 is maintained in the ON state and the control signal Se is maintained at a high level.

The SPAD 510 is charged again during the period from time t13 to time t14. However, since the potential Pn does not exceed the logic threshold Th during the period from the time t13 to the time t14, the input signal Sd is maintained at a high level. Therefore, during the period from the time t13 to the time t14, the detection signal S8 is maintained at a high level according to the input signal Sd having a high-level.

At time t14, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops. Further, the control signal Se transitions from a high level to a low level at time t14.

Since the periodic signal S1 is maintained at a high level during the period from the time t14 to the time t15, the switch 520 is maintained in the OFF state. Therefore, the SPAD 510 is not charged during the period from the time t14 to the time t15, the potential Pn is maintained to the potential at the time t14, and the input signal Sd is maintained at a high level. Since the control signal Se is maintained at a low level during the period from the time t14 to the time t15, the detection signal S8 having a high-level continues to be output in response to the input signal Sd having a high level immediately before the time t14.

At time t15, a photon enters the SPAD 510. The incidence of photon causes the avalanche multiplication in the SPAD 510. The potential Pn decreases in response to the avalanche multiplication operation of the SPAD 510. Since the potential Pn is lower than the logic threshold Th during the period from the time t14 to the time t15, the input signal Sd is maintained at a high level after the incidence of photon at the time t15. Since the periodic signal S1 is at a high level at time t15, the control signal Se having a low level is input to the control node E of the D-latch circuit 583. Therefore, the detection signal S8 is maintained at a high level in response to the input signal Sd having a high level immediately before the time t14.

Since the periodic signal S1 is maintained at a high level during the period from the time t15 to the time t18, the switch 520 is maintained in the OFF state. Therefore, the SPAD 510 is not charged during the period from the time t15 to the time t18, the potential Pn is maintained to the potential at the time t15, and the input signal Sd is maintained at a high level. Since the control signal Se is maintained at a low level during the period from time t15 to time t18, the detection signal S8 having a high level continues to be output in response to the input signal Sd having a high level immediately before time t14.

At each of the times t16 and t17, a photon enters the SPAD 510. However, the SPAD 510 has already performed the avalanche multiplication operation at time t15. Therefore, the potential Pn, the input signal Sd, and the detection signal S8 do not change due to the incidence of photon at the times t16 and t17.

At time t18, the period P4 ends, and at the same time, the period P5 starts. At time t18, the periodic signal S1 transitions from a high level to a low level, and the switch 520 switches from the OFF state to the ON state. When the switch 520 is turned on, charging of the SPAD 510 is started. At time t18, the control signal Se having a high level is input to the control node E of the D-latch circuit 583. Therefore, the detection signal S8 is maintained at a high level according to the input signal Sd having a high level. At time t18, the counter 560 performs the increment processing. The detection signal S8 output from the circuit 530 immediately before the time t18 is at a high level. As a result, the counter 560 increments the count value.

Since the periodic signal S1 is maintained at a low level during the period from the time t18 to the time t19, the switch 520 is maintained in the ON state and the control signal Se is maintained at a high level. The SPAD 510 is charged during a period from time t18 to time t19. However, since the potential Pn does not exceed the logic threshold Th during the period from the time t18 to the time t19, the input signal Sd is maintained at a high level. Therefore, during the period from the time t18 to the time t19, the detection signal S8 is maintained at a high level according to the input signal Sd having a high level.

At time t19, the potential Pn exceeds the logic threshold Th, and the input signal Sd transitions from a high level to a low level. Since the control signal Se is at a high level at time t19, the detection signal S8 transitions from a high level to a low level according to the input signal Sd.

Since the periodic signal S1 is maintained at a low level during the period from the time t19 to the time t20, the switch 520 is maintained in the ON state and the control signal Se is maintained at a high level. The SPAD 510 is charged during a period from time t19 to time t20. The input signal Sd is maintained at a low level. Therefore, during the period from the time t19 to the time t20, the detection signal S8 is maintained at a low level according to the input signal Sd having a low level.

At time t20, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops. Further, the control signal Se transitions from a high level to a low level at time t20.

Since the periodic signal S1 is maintained at a high level during the period from the time t20 to the time t21, the switch 520 is maintained in the OFF state. Therefore, the SPAD 510 is not charged during the period from the time t20 to the time t21, the potential Pn is maintained to the potential at the time t20, and the input signal Sd is maintained at a low level. Since the control signal Se is maintained at a low level during the period from the time t20 to the time t21, the detection signal S8 having a low level continues to be output in response to the input signal Sd having a low level immediately before the time t20.

At time t21, a photon enters the SPAD 510. The incidence of photon causes the avalanche multiplication in the SPAD 510. In response to the avalanche multiplication operation of the SPAD 510, the potential Pn becomes lower than the logic threshold Th, and the input signal Sd transitions from a low level to a high level. On the other hand, since the periodic signal S1 is at a high level at time t21, the control signal Se having a low level is input to the control node E of the D-latch circuit 583. Therefore, the detection signal S8 does not change in response to the input signal Sd and remains at a low level.

Since the periodic signal S1 is maintained at a high level during the period from the time t21 to the time t22, the switch 520 is maintained in the OFF state. Therefore, the SPAD 510 is not charged during the period from the time t21 to the time t22, the potential Pn is maintained to the potential at the time t21, and the input signal Sd is maintained at a high level. Since the control signal Se is maintained at a low level during the period from the time t21 to the time t22, the detection signal S8 having a low level continues to be output in response to the input signal Sd having a low level immediately before the time t20.

At time t22, the period P5 ends, and at the same time, the period P6 starts. At time t22, the periodic signal S1 transitions from a high level to a low level, and the switch 520 switches from the OFF state to the ON state. When the switch 520 is turned on, charging of the SPAD 510 is started. At time t22, the control signal Se having a high level is input to the control node E of the D-latch circuit 583. As a result, the detection signal S8 transitions from a low level to a high level in response to the input signal Sd having a high level. At time t22, the counter 560 performs the increment processing. The detection signal S8 output from the circuit 530 immediately before the time t22 is at a low level. Therefore, the counter 560 does not increment the count value.

Since the periodic signal S1 is maintained at a low level during the period from the time t22 to the time t23, the switch 520 is maintained in the ON state and the control signal Se is maintained at a high level. The SPAD 510 is charged during the period from time t22 to time t23. However, since the potential Pn does not exceed the logic threshold Th during the period from the time t22 to the time t23, the input signal Sd is maintained at a high level. Therefore, during the period from time t22 to time t23, the detection signal S8 is maintained at high level in response to the input signal Sd having a high level.

At time t23, the potential Pn exceeds the logic threshold Th, and the input signal Sd transitions from a high level to a low level. Since the control signal Se is at a high level at time t23, the detection signal S8 transitions from a high level to a low level according to the input signal Sd.

Since the periodic signal S1 is maintained at a low level during the period from the time t23 to the time t24, the switch 520 is maintained in the ON state and the control signal Se is maintained at a high level. The SPAD 510 is charged during a period from time t23 to time t24. The input signal Sd is maintained at a low level. Therefore, during the period from the time t23 to the time t24, the detection signal S8 is maintained at a low level according to the input signal Sd having a low level.

At time t24, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops. Further, the control signal Se transitions from a high level to a low level at time t24.

Since the periodic signal S1 is maintained at a high level during the period from the time t24 to the time t25, the switch 520 is maintained in the OFF state. Therefore, the SPAD 510 is not charged during the period from the time t24 to the time t25, the potential Pn is maintained to the potential at the time t24, and the input signal Sd is maintained at a low level. Since the control signal Se is maintained at a low level during the period from the time t24 to the time t25, the detection signal S8 having a low level continues to be output in response to the input signal Sd having a low level immediately before the time t24.

At time t25, the period P6 ends, and at the same time, the period P7 starts. At time t25, the periodic signal S1 transitions from a high level to a low level, and the switch 520 switches from the OFF state to the ON state. At time t25, the control signal Se having a high level is input to the control node E of the D-latch circuit 583. As a result, the detection signal S8 transitions from a low level to a high level in response to the input signal Sd having a high level. At time t25, the counter 560 performs the increment processing. The detection signal S8 output from the circuit 530 immediately before the time t25 is at a low level. Therefore, the counter 560 does not increment the count value.

Since the periodic signal S1 is maintained at a low level during the period from the time t25 to the time t26, the switch 520 is maintained in the ON state. Thus, SPAD 510 may be charged during the period of times t25 to t26, but SPAD 510 does not perform the avalanche multiplication operation during the period P6. Therefore, the potential Pn is maintained to the potential at the time t25 during the period from the time t25 to the time t26. Therefore, the input signal Sd is maintained at a low level. As a result, the detection signal S8 is maintained at a low level in response to the input signal Sd having a low level during the period from the time t25 to the time t26.

At time t26, a photon enters the SPAD 510. The incidence of photon causes the avalanche multiplication in the SPAD 510. In response to the avalanche multiplication operation of the SPAD 510, the potential Pn becomes lower than the logic threshold Th, and the input signal Sd transitions from a low level to a high level at time t26. Since the periodic signal S1 is at a low level at time t26, the control signal Se having a high level is input to the control node E of the D-latch circuit 583. Therefore, at time t26, the detection signal S8 transitions from a low level to a high level in response to the input signal Sd having a high level.

At a time between the time t26 and the time t27, a photon enters the SPAD 510. However, the potential Pn has already become lower than the logic threshold Th due to the incidence of photon at the time t26. Therefore, the input signal Sd and the detection signal S8 do not change due to the incidence of photon at the time between the time t26 and the time t27.

Since the periodic signal S1 is maintained at a low level during the period from the time t26 to the time t27, the switch 520 is maintained in the ON state and the control signal Se is maintained at a high level.

The SPAD 510 is charged again during the period from time t26 to time t27.

However, since the potential Pn does not exceed the logic threshold Th during the period from the time t26 to the time t27, the input signal Sd is maintained at a high level. Therefore, during the period from the time t26 to the time t27, the detection signal S8 is maintained at a high level according to the input signal Sd having a high level.

At time t27, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops. Further, the control signal Se transitions from a high level to a low level at time t27.

Since the periodic signal S1 is maintained at a high level during the period from the time t27 to the time t28, the switch 520 is maintained in the OFF state. Therefore, the SPAD 510 is not charged during the period from the time t27 to the time t28, the potential Pn is maintained to the potential at the time t27, and the input signal Sd is maintained at a high level. Since the control signal Se is maintained at a low level during the period from the time t27 to the time t28, the detection signal S8 having a high level continues to be output in response to the input signal Sd having a high level immediately before the time t27.

At time t28, a photon enters the SPAD 510. The incidence of photon causes the avalanche multiplication in the SPAD 510. The potential Pn decreases in response to the avalanche multiplication operation of the SPAD 510. Since the potential Pn is lower than the logic threshold Th during the period from the time t27 to the time t28, the input signal Sd is maintained at a high level after the incidence of photon at the time t28. Since the periodic signal S1 is at a high level at time t28, the control signal Se having a low level is input to the control node E of the D-latch circuit 583. Therefore, the detection signal S8 is maintained at a high level in response to the input signal Sd having a high level immediately before the time t27.

Since the periodic signal S1 is maintained at a high level during the period from the time t28 to the time t31, the switch 520 is maintained in the OFF state. Therefore, the SPAD 510 is not charged during the period from the time t28 to the time t31, the potential Pn is maintained to the potential at the time t28, and the input signal Sd is maintained at a high level. Since the control signal Se is maintained at a low level during the period from the time t28 to the time t31, the detection signal S8 having a high level continues to be output in response to the input signal Sd having a high level immediately before the time t27.

At each of the times t29 and t30, a photon enters the SPAD 510. However, the SPAD 510 has already performed the avalanche multiplication operation by the incidence of photon at the time t28. Therefore, the potential Pn, the input signal Sd, and the detection signal S8 do not change due to the incidence of photon at the respective times t29 and t30.

At time t31, the period P7 ends, and at the same time, the period P8 starts. At time t31, the periodic signal S1 transitions from a high level to a low level, and the switch 520 switches from the OFF state to the ON state. When the switch 520 is turned on, charging of the SPAD 510 is started. At time t31, the control signal Se having a high level is input to the control node E of the D-latch circuit 583. Therefore, the detection signal S8 is maintained at a high level according to the input signal Sd having a high level. At time t31, the counter 560 performs the increment processing. The detection signal S8 output from the circuit 530 immediately before the time t31 is at a high level. Thus, the counter 560 increments the count value.

Since the periodic signal S1 is maintained at a low level during the period from the time t31 to the time t32, the switch 520 is maintained in the ON state and the control signal Se is maintained at a high level. The SPAD 510 is charged during the period from time t31 to time t32. However, since the potential Pn does not exceed the logic threshold Th during the period from the time t31 to the time t32, the input signal Sd is maintained at a high level. Therefore, during the period from time t31 to time t32, the detection signal S8 is maintained at high level in response to the input signal Sd having a high level.

At time t32, the potential Pn exceeds the logic threshold Th, and the input signal Sd transitions from a high level to a low level. Since the control signal Se is at a high level at time t32, the detection signal S8 transitions from a high level to a low level according to the input signal Sd.

Since the periodic signal S1 is maintained at a low level during the period from the time t32 to the time t33, the switch 520 is maintained in the ON state and the control signal Se is maintained at a high level. The SPAD 510 is charged during a period from time t32 to time t33. The input signal Sd is maintained at a low level. Therefore, during the period from the time t32 to the time t33, the detection signal S8 is maintained at a low level according to the input signal Sd having a low level.

At time t33, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops. Further, the control signal Se transitions from a high level to a low level at time t33.

Since the periodic signal S1 is maintained at a high level during the period from the time t33 to the time t34, the switch 520 is maintained in the OFF state. Therefore, the SPAD 510 is not charged during the period from the time t33 to the time t34, the potential Pn is maintained to the potential at the time t33, and the input signal Sd is maintained at a low level. Since the control signal Se is maintained at a low level during the period from the time t33 to the time t34, the detection signal S8 having a low level continues to be output in response to the input signal Sd having a low level immediately before the time t33.

At time t34, a photon enters the SPAD 510. The incidence of photon causes the avalanche multiplication in the SPAD 510. In response to the avalanche multiplication operation of the SPAD 510, the potential Pn becomes lower than the logic threshold Th, and the input signal Sd transitions from a low level to a high level. On the other hand, since the periodic signal S1 is at a high level at time t34, the control signal Se having a low level is input to the control node E of the D-latch circuit 583. Therefore, the detection signal S8 does not change in response to the input signal Sd and remains at a low level.

Since the periodic signal S1 is maintained at a high level during the period from the time t34 to the time t35, the switch 520 is maintained in the OFF state. Therefore, the SPAD 510 is not charged during the period from the time t34 to the time t35, the potential Pn is maintained to the potential at the time t34, and the input signal Sd is maintained at a high level. Since the control signal Se is maintained at a low level during the period from the time t34 to the time t35, the detection signal S8 having a low level continues to be output in response to the input signal Sd having a low level immediately before the time t33.

As shown in FIG. 4, when the setting signal S4 having a high level is input to the pixel unit 50, the circuit 530 generates a detection signal having a high level based on a change in the voltage of the SPAD 510 during a period in which the switch 520 is in the ON state. That is, in case that the setting signal S4 having a high level is input to the pixel unit 50, the circuit 530 outputs, during periods in which the switch 520 is in the ON and OFF states, a detection signal based on the voltage of the SPAD 510 during the period in which the switch 520 is in the ON state. On the other hand, when the setting signal S4 having a high level is input to the pixel unit 50, the circuit 530 does not generate the detection signal having a high level based on the change in the voltage of the SPAD 510 during a period in which the switch 520 is in the OFF state. In other words, in case that the setting signal S4 having a high level is input to the pixel unit 50, only photons incident during periods in which the switch 520 is in the ON state are subjected to the increment of the count value. As a result, the counter 560 increments the count value based on the photon incident on the SPAD 510 at the time t14 of the period P4 and the photon incident on the SPAD 510 at the time t26 of the period P7. On the other hand, the photons incident during the periods in which the switch 520 is in the OFF state are not subjected to the increment of the count value. That is, the counter 560 does not increment the count value based on the photons entering the SPAD 510 at time t6 of the period P2, times t10 and t11 of the period P3, times t15, t16 and t17 of the period P4, times t21 of the period P5, times t28, t29 and t30 of the period P7, and times t34 of the period P8. Therefore, the photon detection periods Pd of the pixel unit 50 when the setting signal S4 having a high level is input to the pixel unit 50 are the hatched portions shown in FIG. 4 corresponding to the periods in which the periodic signal S1 is at a low level. In the period P7, while the periodic signal S1 is at a low level, a photon enters the SPAD 510 twice. However, the counter 560 does not increment the count value twice but increases the count value only by one.

The photoelectric conversion device 100 according to the present disclosure allows to limit the photon detection period during one period of the periodic signal S1 in case that the setting signal S4 having a high level is input to the pixel unit 50. Therefore, in photographing under high illuminance by using an imaging system including the photoelectric conversion device 100, the frequency of detection of photons incident on the SPAD 510 can be reduced without adding a separate light reduction filter, a period for suppressing photon detection, a clock for light reduction, and the like.

Figure 5:
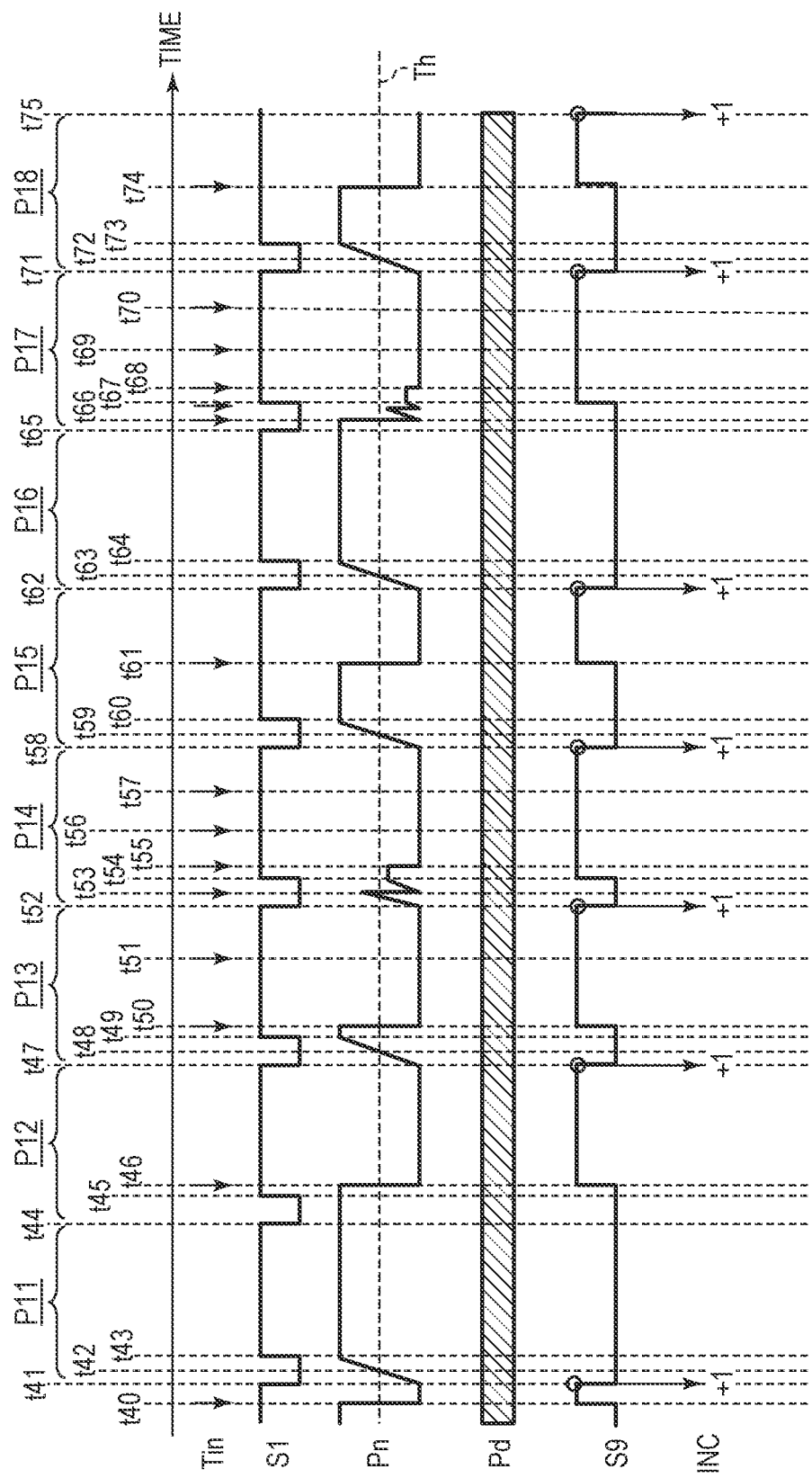
FIG. 5 illustrates a timing chart showing the operation of the counting unit according to the first embodiment.

FIG. 5 is a timing chart showing the operation of the counter according to the first embodiment. Each of the periods P11 to P18 corresponds to one period of the periodic signal S1. In the periods P11 to P18, the setting signal S4 having a low level is input to the pixel unit 50. That is, in the periods P11 to P18, the detection signal S9 transmitted from the circuit 540 is selected by the selector 550. As a result, the detection signal S9 is sampled in each of the periods P11 to P18 shown in FIG. 5. FIG. 5 shows a chart of the timing Tin of the incidence of photon in the periods P11 to P18 to the SPAD 510, the periodic signal S1 input to the gate of the switch 520, the potential Pn of the node N, the photon detection period Pd in the periods P11 to P18, the detection signal S9 from the circuit 540, and timing of the increment operation INC by the counter 560.

At time t40 before the period P11, a photon enters the SPAD 510. The incidence of photon causes the avalanche multiplication in the SPAD 510. In response to the avalanche multiplication operation of the SPAD 510, the potential Pn of the node N becomes lower than the logic threshold Th, and a signal having a high level is input to the input node In2 of the AND gate 584 via the NOT gate 581. Since the periodic signal S1 is at a high level at time t40, a signal having a high level is input to the input node In1 of the AND gate 584. As a result, the detection signal S9 transmitted from the circuit 540 transitions from a low level to a high level based on the input signals having a high level to the input nodes In1 and In2.

Since the periodic signal S1 is at a high level from the time t40 to the time t41 from which the period P1 starts, the switch 520 is maintained in the OFF state. Therefore, during the period from the time t40 to the time t41, the SPAD 510 is not charged, the potential Pn is maintained at a low level, and the input signal to the input node In2 is maintained at a high level. The input signal to the input node In1 is maintained at a high level according to the periodic signal S1. Therefore, the detection signal S9 is maintained at a high level.

At time t41, the periodic signal S1 transitions from a high level to a low level, and the switch 520 switches from the OFF state to the ON state. When the switch 520 is turned on, charging of the SPAD 510 is started. At time t41, the input signal to the input node In1 transitions from a high level to a low level according to the periodic signal S1. As a result, the detection signal S9 transitions from a high level to a low level based on the input signal having a low level to the input node In1. Further, at time t41, the counter 560 performs the increment processing. The detection signal S9 output from the circuit 540 immediately before the time t41 is at a high level. As a result, the counter 560 increments the count value.

Since the periodic signal S1 is maintained at a low level during the period from the time t41 to the time t42, the switch 520 is maintained in the ON state and the SPAD 510 is charged. However, since the potential Pn does not exceed the logic threshold Th during the period from the time t41 to the time t42, the input signal to the input node In2 is maintained at a high level. On the other hand, the input signal to the input node In1 is maintained at a low level according to the periodic signal S1. Therefore, during the period from the time t41 to the time t42, the detection signal S9 is maintained at a low level based on the input signal having a low level to the input node In1.

At time t42, the potential Pn exceeds the logic threshold Th, and the input signal to the input node In2 transitions from a high level to a low level. The detection signal S9 is maintained at a low level based on the input signals having a low level to the input nodes In1 and In2.

Since the periodic signal S1 is maintained at a low level during the period from the time t42 to the time t43, the switch 520 is maintained in the ON state and the SPAD 510 is continuously charged. The input signal to the input node In2 is maintained at a low level according to the potential Pn. The input signal to the input node In1 is maintained at a low level according to the periodic signal S1. Therefore, during the period from the time t42 to the time t43, the detection signal S9 is maintained at a low level based on the input signals having a low level to the input nodes In1 and In2.

At time t43, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops.

The input signal to the input node In2 is maintained at a low level according to the potential Pn. At time t43, the input signal to the input node In1 transitions from a low level to a high level according to the periodic signal S1. At time t43, the detection signal S9 is maintained at a low level based on the input signal having a low level to the input node In2.

Since the periodic signal S1 is maintained at a high level during the period from the time t43 to the time t44, the switch 520 is maintained in the OFF state. Therefore, the SPAD 510 is not charged during the period from the time t43 to the time t44, the potential Pn is maintained to the potential at the time t43, and the input signal to the input node In2 is maintained at a low level. The input signal to the input node In1 is maintained at a high level according to the periodic signal S1. During the period from the time t43 to the time t44, the detection signal S9 is maintained at a low level based on the input signal having a low level to the input node In2.

At time t44, the period P11 ends, and at the same time, the period P12 starts. At time t44, the periodic signal S1 transitions from a high level to a low level, and the switch 520 switches from the OFF state to the ON state. At time t44, the input signal to the input node In1 transitions from a high level to a low level according to the periodic signal S1. Since the SPAD 510 does not perform the avalanche multiplication operation in the period P11, the input signal to the input node In2 is maintained at a low level. Therefore, the detection signal S9 is maintained at a low level based on the input signals having a low level to the input nodes In1 and In2. Further, at time t44, the counter 560 performs the increment processing. The detection signal S9 output from the circuit 540 immediately before the time t44 is at a low level. Therefore, the counter 560 does not increment the count value.

Since the periodic signal S1 is maintained at a low level during the period from the time t44 to the time t45, the switch 520 is maintained in the ON state. Thus, although the SPAD 510 may be charged during the period from the time t44 to the time t45, the SPAD 510 did not perform the avalanche multiplication operation during the period P11. Therefore, the potential Pn is maintained to the potential at the time t44 during the period from the time t44 to the time t45. As a result, the input signal to the input node In2 is maintained at a low level. The input signal to the input node In1 is maintained at a low level according to the periodic signal S1. As a result, the detection signal S9 is maintained at a low level based on the input signals having a low level to the input nodes In1 and In2 during the period from the time t44 to the time t45.

At time t45, the periodic signal S1 transitions from a low level to a high level, and the switch 520 switches from the ON state to the OFF state. The input signal to the input node In2 is maintained at a low level according to the potential Pn. At time t45, the input signal to the input node In1 transitions from a low level to a high level according to the periodic signal S1. At time t45, the detection signal S9 is maintained at a low level based on the input signal having a low level to the input node In2.

Since the periodic signal S1 is maintained at a high level during the period from the time t45 to the time t46, the switch 520 is maintained in the OFF state. Therefore, the potential Pn is maintained to the potential at the time t45, and the input signal to the input node In2 is maintained at a low level. The input signal to the input node In1 is maintained at a high level according to the periodic signal S1. During the period from the time t45 to the time t46, the detection signal S9 is maintained at a low level based on the input signal having a low level to the input node In2.

At time t46, a photon enters the SPAD 510. The incidence of photon causes the avalanche multiplication in the SPAD 510. In response to the avalanche multiplication operation of the SPAD 510, the potential Pn becomes lower than the logic threshold Th, and a signal having a high level is input to the input node In2. Since the periodic signal S1 is at a high level at time t46, a signal having a high level is input to the input node In1. As a result, the detection signal S9 transmitted from the circuit 540 transitions from a low level to a high level based on the input signals having a high level to the input nodes In1 and In2.

Since the periodic signal S1 is maintained at a high level during the period from the time t46 to the time t47, the switch 520 is maintained in the OFF state. Therefore, the potential Pn is maintained to the potential at the time t46, and the input signal to the input node In2 is maintained at a high level. The input signal to the input node In1 is maintained at a high level according to the periodic signal S1. Therefore, during the period from the time t46 to the time t47, the detection signal S9 is maintained at a high level based on the input signals having a high level to the input nodes In1 and In2.

At time t47, the period P12 ends, and at the same time, the period P13 starts. At time t47, the periodic signal S1 transitions from a high level to a low level, and the switch 520 switches from the OFF state to the ON state. When the switch 520 is turned on, charging of the SPAD 510 is started. At time t47, the input signal to the input node In1 transitions from a high level to a low level according to the periodic signal S1. As a result, the detection signal S9 transitions from a high level to a low level based on the input signal having a low level to the input node In1. Further, at time t47, the counter 560 performs the increment processing. The detection signal S9 output from the circuit 540 immediately before the time t47 is at a high level. As a result, the counter 560 increments the count value.

Since the periodic signal S1 is maintained at a low level during the period from the time t47 to the time t48, the switch 520 is maintained in the ON state and the SPAD 510 is charged. However, since the potential Pn does not exceed the logic threshold Th during the period from the time t47 to the time t48, the input signal to the input node In2 is maintained at a high level. On the other hand, the input signal to the input node In1 is maintained at a low level according to the periodic signal S1. Therefore, during the period from the time t47 to the time t48, the detection signal S9 is maintained at a low level based on the input signal having a low level to the input node In1.

At time t48, the potential Pn exceeds the logic threshold Th, and the input signal to the input node In2 transitions from a high level to a low level. The detection signal S9 is maintained at a low level based on the input signals having a low level to the input nodes In1 and In2.

Since the periodic signal S1 is maintained at a low level during the period from the time t48 to the time t49, the switch 520 is maintained in the ON state and the SPAD 510 is continuously charged. The input signal to the input node In2 is maintained at a low level according to the potential Pn. The input signal to the input node In1 is maintained at a low level according to the periodic signal S1. Therefore, during the period from the time t48 to the time t49, the detection signal S9 is maintained at a low level based on the input signals having a low level to the input nodes In1 and In2.

At time t49, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops.

The input signal to the input node In2 is maintained at a low level according to the potential Pn. At time t49, the input signal to the input node In1 transitions from a low level to a high level according to the periodic signal S1. At time t49, the detection signal S9 is maintained at a low level based on the input signal having a low level to the input node In2.

Since the periodic signal S1 is maintained at a high level during the period from the time t49 to the time t50, the switch 520 is maintained in the OFF state. Therefore, the potential Pn is maintained to the potential at the time t49, and the input signal to the input node In2 is maintained at a low level. The input signal to the input node In1 is maintained at a high level according to the periodic signal S1. During the period from the time t49 to the time t50, the detection signal S9 is maintained at a low level based on the input signal having a low level to the input node In2.

At time t50, a photon enters the SPAD 510. The incidence of photon causes the avalanche multiplication in the SPAD 510. In response to the avalanche multiplication operation of the SPAD 510, the potential Pn becomes lower than the logic threshold Th, and a signal having a high level is input to the input node In2. Since the periodic signal S1 is high level at time t50, a signal having a high level is input to the input node In1. As a result, the detection signal S9 from the circuit 540 transitions from a low level to a high level based on the input signals having a high level to the input nodes In1 and In2.

Since the periodic signal S1 is maintained at a high level during the period from the time t50 to the time t52, the switch 520 is maintained in the OFF state. Therefore, the potential Pn is maintained to the potential at the time t50, and the input signal to the input node In2 is maintained at a high level. The input signal to the input node In1 is maintained at a high level according to the periodic signal S1. Therefore, during the period from the time t50 to the time t52, the detection signal S9 is maintained at a high level based on the input signals having a high level to the input nodes In1 and In2.

At time t51, a photon enters the SPAD 510. However, the SPAD 510 has already performed the avalanche multiplication operation by the incidence of photon at the time t50. Therefore, the potential Pn and the detection signal S9 do not change due to the incidence of photon at the time t51.

At time t52, the period P13 ends, and at the same time, the period P14 starts. At time t52, the periodic signal S1 transitions from a high level to a low level, and the switch 520 switches from the OFF state to the ON state. When the switch 520 is turned on, charging of the SPAD 510 is started. At time t52, the input signal to the input node In1 transitions from a high level to a low level according to the periodic signal S1. As a result, the detection signal S9 transitions from a high level to a low level based on the input signal having a low level to the input node In1. Further, at time t52, the counter 560 performs the increment processing. The detection signal S9 output from the circuit 540 immediately before the time t52 is at a high level. As a result, the counter 560 increments the count value.

Since the periodic signal S1 is maintained at a low level during the period from the time t52 to the time t53, the switch 520 is maintained in the ON state and the SPAD 510 is charged. Before the time t53 is reached, the potential Pn exceeds the logic threshold Th, and the input signal to the input node In2 transitions from a high level to a low level. On the other hand, the input signal to the input node In1 is maintained at a low level according to the periodic signal S1. During the period from the time t52 to the time t53, the detection signal S9 is maintained at a low level based on the input signal having a low level to the input node In1.

At time t53, a photon enters the SPAD 510. The incidence of photon causes the avalanche multiplication in the SPAD 510. In response to the avalanche multiplication operation of the SPAD 510, the potential Pn becomes lower than the logic threshold Th, and the input signal to the input node In2 transitions from a low level to a high level. On the other hand, the input signal to the input node In1 is maintained at a low level according to the periodic signal S1. Therefore, at time t53, the detection signal S9 is maintained at a low level based on the input signal having a low level to the input node In1.

Since the periodic signal S1 is maintained at a low level during the period from the time t53 to the time t54, the switch 520 is maintained in the ON state, and the SPAD 510 is charged again. However, since the potential Pn does not exceed the logic threshold Th during the period from the time t53 to the time t54, the input signal to the input node In2 is maintained at a high level. On the other hand, the input signal to the input node In1 is maintained at a low level according to the periodic signal S1. Therefore, from time t53 to time t54, the detection signal S9 is maintained at a low level based on the input signal having a low level to the input node In1.

At time t54, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops.

The input signal to the input node In2 is maintained at a high level according to the potential Pn. At time t54, the input signal to the input node In1 transitions from a low level to a high level according to the periodic signal S1. Therefore, at time t54, the detection signal S9 transitions from a low level to a high level based on the input signals having a high level to the input nodes In1 and In2.

Since the periodic signal S1 is maintained at a high level during the period from the time t54 to the time t55, the switch 520 is maintained in the OFF state. Therefore, the potential Pn is maintained to the potential at the time t54, and the input signal to the input node In2 is maintained at a high level. The input signal to the input node In1 is maintained at a high level according to the periodic signal S1. Therefore, during the period from the time t54 to the time t55, the detection signal S9 is maintained at a high level based on the input signals having a high level to the input nodes In1 and In2.

At time t55, a photon enters the SPAD 510. The incidence of photon causes the avalanche multiplication in the SPAD 510. The potential Pn decreases in response to the avalanche multiplication operation of the SPAD 510. Since the potential Pn is lower than the logic threshold Th during the period from the time t54 to the time t55, the input signal to the input node In2 is maintained at a high level after the incidence of photon at the time t55. Since the periodic signal S1 is high level at time t55, a signal having a high level is input to the input node In1. Therefore, the detection signal S9 transmitted from the circuit 540 is maintained at a high level based on the input signals having a high level to the input nodes In1 and In2.

Since the periodic signal S1 is maintained at a high level during the period from the time t55 to the time t58, the switch 520 is maintained in the OFF state. Therefore, the potential Pn is maintained to the potential at the time t55, and the input signal to the input node In2 is maintained at a high level. The input signal to the input node In1 is maintained at a high level according to the periodic signal S1. Therefore, during the period from the time t55 to the time t58, the detection signal S9 is maintained at a high level based on the input signals having a high level to the input nodes In1 and In2.

At times t56 and t57, a photon enters the SPAD 510. However, the SPAD 510 has already performed the avalanche multiplication operation by the incidence of photon at the time t55. Therefore, the potential Pn and the detection signal S9 do not change due to the incidence of photon at times t56 and t57.

At time t58, the period P14 ends, and at the same time, the period P15 starts. At time t58, the periodic signal S1 transitions from a high level to a low level, and the switch 520 switches from the OFF state to the ON state. When the switch 520 is turned on, charging of the SPAD 510 is started. At time t58, the input signal to the input node In1 transitions from a high level to a low level according to the periodic signal S1. As a result, the detection signal S9 transitions from a high level to a low level based on the input signal having a low level to the input node In1. Further, at time t58, the counter 560 performs the increment processing. The detection signal S9 output from the circuit 540 immediately before the time t58 is at a high level. As a result, the counter 560 increments the count value.

Since the periodic signal S1 is maintained at a low level during the period from the time t58 to the time t59, the switch 520 is maintained in the ON state and the SPAD 510 is charged. However, since the potential Pn does not exceed the logic threshold Th during the period from the time t58 to the time t59, the input signal to the input node In2 is maintained at a high level. On the other hand, the input signal to the input node In1 is maintained at a low level according to the periodic signal S1. Therefore, during the period from the time t58 to the time t59, the detection signal S9 is maintained at a low level based on the input signal having a low level to the input node In1.

At time t59, the potential Pn exceeds the logic threshold Th, and the input signal to the input node In2 transitions from a high level to a low level. The detection signal S9 is maintained at a low level based on the input signals having a low level to the input nodes In1 and In2.

Since the periodic signal S1 is maintained at a low level during the period from the time t59 to the time t60, the switch 520 is maintained in the ON state and the SPAD 510 is continuously charged. The input signal to the input node In2 is maintained at a low level according to the potential Pn. The input signal to the input node In1 is maintained at a low level according to the periodic signal S1. Therefore, during the period from the time t59 to the time t60, the detection signal S9 is maintained at a low level based on the input signals having a low level to the input nodes In1 and In2.

At time t60, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops.

The input signal to the input node In2 is maintained at a low level according to the potential Pn. At time t60, the input signal to the input node In1 transitions from a low level to a high level according to the periodic signal S1. At time t60, the detection signal S9 is maintained at a low level based on the input signal having a low level to the input node In2.

Since the periodic signal S1 is maintained at a high level during the period from the time t60 to the time t61, the switch 520 is maintained in the OFF state. Therefore, the potential Pn is maintained to the potential at the time t60, and the input signal to the input node In2 is maintained at a low level. The input signal to the input node In1 is maintained at a high level according to the periodic signal S1. During the period from the time t60 to the time t61, the detection signal S9 is maintained at a low level based on the input signal having a low level to the input node In2.

At time t61, a photon enters the SPAD 510. The incidence of photon causes the avalanche multiplication in the SPAD 510. In response to the avalanche multiplication operation of the SPAD 510, the potential Pn becomes lower than the logic threshold Th, and a signal having a high level is input to the input node In2. Since the periodic signal S1 is at high level at time t61, a signal having a high level is input to the input node In1. As a result, the detection signal S9 transmitted from the circuit 540 transitions from a low level to a high level based on the input signals having a high level to the input nodes In1 and In2.

Since the periodic signal S1 is maintained at a high level during the period from the time t61 to the time t62, the switch 520 is maintained in the OFF state. Therefore, the potential Pn is maintained to the potential at the time t61, and the input signal to the input node In2 is maintained at a high level. The input signal to the input node In1 is maintained at a high level according to the periodic signal S1. Therefore, during the period from the time t61 to the time t62, the detection signal S9 is maintained at a high level based on the input signals having a high level to the input nodes In1 and In2.

At time t62, the period P15 ends, and at the same time, the period P16 starts. At time t62, the periodic signal S1 transitions from a high level to a low level, and the switch 520 switches from the OFF state to the ON state. When the switch 520 is turned on, charging of the SPAD 510 is started. At time t62, the input signal to the input node In1 transitions from a high level to a low level according to the periodic signal S1. As a result, the detection signal S9 transitions from a high level to a low level based on the input signal having a low level to the input node In1. Further, at time t62, the counter 560 performs the increment processing. The detection signal S9 output from the circuit 540 immediately before the time t62 is at a high level. As a result, the counter 560 increments the count value.

Since the periodic signal S1 is maintained at a low level during the period from the time t62 to the time t63, the switch 520 is maintained in the ON state and the SPAD 510 is charged. However, since the potential Pn does not exceed the logic threshold Th during the period from the time t62 to the time t63, the input signal to the input node In2 is maintained at a high level. On the other hand, the input signal to the input node In1 is maintained at a low level according to the periodic signal S1. Therefore, during the period from the time t62 to the time t63, the detection signal S9 is maintained at a low level based on the input signal having a low level to the input node In1.

At time t63, the potential Pn exceeds the logic threshold Th, and the input signal to the input node In2 transitions from a high level to a low level. The detection signal S9 is maintained at a low level based on the input signals having a low level to the input nodes In1 and In2.

Since the periodic signal S1 is maintained at a low level during the period from the time t63 to the time t64, the switch 520 is maintained in the ON state and the SPAD 510 is continuously charged. The input signal to the input node In2 is maintained at a low level according to the potential Pn. The input signal to the input node In1 is maintained at a low level according to the periodic signal S1. Therefore, during the period from the time t63 to the time t64, the detection signal S9 is maintained at a low level based on the input signals having a low level to the input nodes In1 and In2.

At time t64, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops.

The input signal to the input node In2 is maintained at a low level according to the potential Pn. At time t64, the input signal to the input node In1 transitions from a low level to a high level according to the periodic signal S1. At time t64, the detection signal S9 is maintained at a low level based on the input signal having a low level to the input node In2.

Since the periodic signal S1 is maintained at a high level during the period from the time t64 to the time t65, the switch 520 is maintained in the OFF state. Therefore, the SPAD 510 is not charged during the period from the time t64 to the time t65, the potential Pn is maintained to the potential at the time t64, and the input signal to the input node In2 is maintained at a low level. The input signal to the input node In1 is maintained at a high level according to the periodic signal S1. During the period from the time t64 to the time t65, the detection signal S9 is maintained at a low level based on the input signal having a low level to the input node In2.

At time t65, the period P16 ends, and at the same time, the period P17 starts. At time t65, the periodic signal S1 transitions from a high level to a low level, and the switch 520 switches from the OFF state to the ON state. At time t65, the input signal to the input node In1 transitions from a high level to a low level according to the periodic signal S1. Since the SPAD 510 does not perform the avalanche multiplication operation in the period P16, the input signal to the input node In2 is maintained at a low level. Therefore, the detection signal S9 is maintained at a low level based on the input signals having a low level to the input nodes In1 and In2. Further, at time t65, the counter 560 performs the increment processing. The detection signal S9 output from the circuit 540 immediately before the time t65 is at a low level. Therefore, the counter 560 does not increment the count value.

Since the periodic signal S1 is maintained at a low level during the period from the time t65 to the time t66, the switch 520 is maintained in the ON state. Thus, the SPAD 510 may be charged during the period of times t65 to t66, but the SPAD 510 does not perform the avalanche multiplication operation during the period P16. Therefore, the potential Pn is maintained to the potential at the time t65 during the period from the time t65 to the time t66. As a result, the input signal to the input node In2 is maintained at a low level. The input signal to the input node In1 is maintained at a low level according to the periodic signal S1. Therefore, the detection signal S9 is maintained at a low level based on the input signals having a low level to the input nodes In1 and In2 during the period from the time t65 to the time t66.

At time t66, a photon enters the SPAD 510. The incidence of photon causes the avalanche multiplication in the SPAD 510. In response to the avalanche multiplication operation of the SPAD 510, the potential Pn becomes lower than the logic threshold Th, and the input signal to the input node In2 transitions from a low level to a high level. On the other hand, the input signal to the input node In1 is maintained at a low level according to the periodic signal S1. Therefore, at time t66, the detection signal S9 is maintained at a low level based on the input signal having a low level to the input node In1.

Since the periodic signal S1 is maintained at a low level during the period from the time t66 to the time t67, the switch 520 is maintained in the ON state, and the SPAD 510 is charged again. However, since the potential Pn does not exceed the logic threshold Th during the period from the time t66 to the time t67, the input signal to the input node In2 is maintained at a high level. On the other hand, the input signal to the input node In1 is maintained at a low level according to the periodic signal S1. Therefore, during a period from the time t66 to the time t67, the detection signal S9 is maintained at a low level based on the input signal having a low level to the input node In1.

At a time between the time t66 and the time t67, a photon enters the SPAD 510. However, the potential Pn has already become lower than the logic threshold Th due to the incidence of photon at the time t66. Therefore, the input signal to the input node In2 and the detection signal S9 do not change due to the incidence of photon at the time between the time t26 and the time t27.

At time t67, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops.

The input signal to the input node In2 is maintained at a high level according to the potential Pn. At time t67, the input signal to the input node In1 transitions from a low level to a high level according to the periodic signal S1. Therefore, at time t67, the detection signal S9 transitions from a low level to a high level based on the input signals having a high level to the input nodes In1 and In2.

Since the periodic signal S1 is maintained at a high level during the period from the time t67 to the time t68, the switch 520 is maintained in the OFF state. Therefore, the potential Pn is maintained to the potential at the time t67, and the input signal to the input node In2 is maintained at a high level. The input signal to the input node In1 is maintained at a high level according to the periodic signal S1. Therefore, during the period from the time t67 to the time t68, the detection signal S9 is maintained at a high level based on the input signals having a high level to the input nodes In1 and In2.

At time t68, a photon enters the SPAD 510. The incidence of photon causes the avalanche multiplication in the SPAD 510. The potential Pn decreases in response to the avalanche multiplication operation of the SPAD 510. Since the potential Pn is lower than the logic threshold Th during the period from the time t67 to the time t68, the input signal to the input node In2 is maintained at a high level after the incidence of photon at the time t68. Since the periodic signal S1 is at a high level at time t68, a signal having a high level is input to the input node In1. Therefore, the detection signal S9 from the circuit 540 is maintained at a high level based on the input signals having a high level to the input nodes In1 and In2.

Since the periodic signal S1 is maintained at a high level during the period from the time t68 to the time t71, the switch 520 is maintained in the OFF state. Therefore, the potential Pn is maintained to the potential at the time t68, and the input signal to the input node In2 is maintained at a high level. The input signal to the input node In1 is maintained at a high level according to the periodic signal S1. Therefore, during the period from the time t68 to the time t71, the detection signal S9 is maintained at a high level based on the input signals having a high level to the input nodes In1 and In2.

At times t69 and t70, a photon enters the SPAD 510. However, the SPAD 510 has already performed the avalanche multiplication operation by the incidence of photon at the time t68. Therefore, the potential Pn and the detection signal S9 do not change due to the incidence of photon at times t69 and t70.

At time t71, the period P17 ends, and at the same time, the period P18 starts. At time t71, the periodic signal S1 transitions from a high level to a low level, and the switch 520 switches from the OFF state to the ON state. When the switch 520 is turned on, charging of the SPAD 510 is started. At time t71, the input signal to the input node In1 transitions from a high level to a low level according to the periodic signal S1. As a result, the detection signal S9 transitions from a high level to a low level based on the input signal having a low level to the input node In1. Further, at time t71, the counter 560 performs the increment processing. The detection signal S9 output from the circuit 540 immediately before the time t71 is at a high level. As a result, the counter 560 increments the count value.

Since the periodic signal S1 is maintained at a low level during the period from the time t71 to the time t72, the switch 520 is maintained in the ON state and the SPAD 510 is charged. However, since the potential Pn does not exceed the logic threshold Th during the period from the time t71 to the time t72, the input signal to the input node In2 is maintained at a high level. On the other hand, the input signal to the input node In1 is maintained at a low level according to the periodic signal S1. Therefore, during the period from the time t71 to the time t72, the detection signal S9 is maintained at a low level based on the input signal having a low level to the input node In1.

At time t72, the potential Pn exceeds the logic threshold Th, and the input signal to the input node In2 transitions from a high level to a low level. The detection signal S9 is maintained at a low level based on the input signals having a low level to the input nodes In1 and In2.

Since the periodic signal S1 is maintained at a low level during the period from the time t72 to the time t73, the switch 520 is maintained in the ON state and the SPAD 510 is continuously charged. The input signal to the input node In2 is maintained at a low level according to the potential Pn. The input signal to the input node In1 is maintained at a low level according to the periodic signal S1. Therefore, during the period from the time t72 to the time t73, the detection signal S9 is maintained at a low level based on the input signals having a low level to the input nodes In1 and In2.

At time t73, the periodic signal S1 transitions from a low level to a high level, and the switch 520 switches from the ON state to the OFF state. When the switch 520 is switched to the OFF state, charging of the SPAD 510 is stopped. That is, a rise of the potential Pn stops.

The input signal to the input node In2 is maintained at a low level according to the potential Pn. At time t73, the input signal to the input node In1 transitions from a low level to a high level according to the periodic signal S1. At time t73, the detection signal S9 is maintained at a low level based on the input signal having a low level to the input node In2.

Since the periodic signal S1 is maintained at a high level during the period from the time t73 to the time t74, the switch 520 is maintained in the OFF state. Therefore, the potential Pn is maintained to the potential at the time t73, and the input signal to the input node In2 is maintained at a low level. The input signal to the input node In1 is maintained at a high level according to the periodic signal S1. During the period from the time t73 to the time t74, the detection signal S9 is maintained at a low level based on the input signal having a low level to the input node In2.

At time t74, a photon enters the SPAD 510. The incidence of photon causes the avalanche multiplication in the SPAD 510. In response to the avalanche multiplication operation of the SPAD 510, the potential Pn becomes lower than the logic threshold Th, and a signal having a high level is input to the input node In2. Since the periodic signal S1 is at a high level at time t74, a signal having a high level is input to the input node In1. As a result, the detection signal S9 transmitted from the circuit 540 transitions from a low level to a high level based on the input signals having a high level to the input nodes In1 and In2.

Since the periodic signal S1 is maintained at a high level during the period from the time t74 to the time t75, the switch 520 is maintained in the OFF state. Therefore, the potential Pn is maintained to the potential at the time t74, and the input signal to the input node In2 is maintained at a high level. The input signal to the input node In1 is maintained at a high level according to the periodic signal S1. Therefore, during the period from the time t74 to the time t75, the detection signal S9 is maintained at a high level based on the input signals having a high level to the input nodes In1 and In2.

As shown in FIG. 5, in case that the setting signal S4 having a low level is input to the pixel unit 50, the circuit 540 generates a detection signal having a high level based on the change in the voltage of the SPAD 510 during the period in which the switch 520 is in the ON state and in the OFF state. That is, the circuit 540 outputs, in a period when the switch 520 is in the OFF state, a detection signal based on the voltage of the SPAD 510 in periods when the switch 520 is in the ON and OFF states. Therefore, in case that the setting signal S4 having a low level is input to the pixel unit 50, photons incident in the periods when the switch 520 is in both the ON and OFF states are subjected to the increment of the count value. Thus, in case that the setting signal S4 having a low level is input to the pixel unit 50, the photon detection period Pd of the pixel unit 50 is a hatched portion shown in FIG. 5 corresponding to the entire periods of the periodic signal S1.

In the periods P13, P14, and P17, photons enter the SPAD 510 multiple times during one cycle of the periodic signal S1, but the counter 560 does not increment the count value by the number of times but increases the count value only by one.

The photoelectric conversion device 100 according to the present disclosure can detect photons in the entire period of the periodic signal S1 in case that the setting signal S4 having a low level is input to the pixel unit 50. Therefore, the number of detections of photons entering the SPAD 510 can be increased when photographing under low illuminance using an imaging system including the photoelectric conversion device 100. As a result, the photoelectric conversion device 100 according to the present disclosure can provide images with high gradation even in photographing under low illuminance.

According to the present embodiment, the SPAD 510 working as a detector is charged, and a photon is detected by using current flowing in response to incidence of photon. After the photon enters the SPAD 510, the SPAD 510 needs to be recharged to detect a next photon entering the SPAD 510. The count value indicating the number of times the photons are detected corresponds to the pixel value of the pixel unit 50. As shown in FIGS. 4 and 5, even if multiple photons enter the SPAD 510 during one period of the periodic signal S1, the count value is increased by one regardless of the number of times of incidence. For example, under high illuminance, two or more photons may enter the SPAD 510 during one cycle of the periodic signal S1, but an increase in pixel value (count value) is saturated by the incidence of the first photon in the one cycle. Therefore, sufficient gradation cannot be obtained for an image captured under high illuminance in some cases. If sufficient gradation cannot be obtained, the captured image may result in blown-out highlight, and the quality of the captured image may be degraded. As a result of the degradation, the captured subjects may not be identified, for example.

To avoid saturation of an increase in pixel value (count value), one may consider increasing the frequency of the periodic signal S1 to shorten the period. However, increasing the frequency of the periodic signal S1 increases the power consumption of the imaging system including the photoelectric conversion device, and increases the amount of heat generated from the imaging system. Further, a larger number of circuits may be required to expand the bit width of the counter, which may cause a problem of increasing the manufacturing cost. Further, to avoid saturation of an increase in pixel value, one may consider physically reducing the amount of incident photons by inserting a light reduction filter or the like in a path of incident photons. For inserting the light reduction filter or the like, however, a separate mechanism for inserting and extracting the light reduction filter into and from the imaging system is required, which makes difficult to downsize the imaging system. Further, requiring the operation of inserting and extracting the light reduction filter may cause a slower response to the change in illuminance.

As shown in FIGS. 4 and 5, the photoelectric conversion device 100 according to the present disclosure allows to control the detection period of photons during one period of the periodic signal S1 by switching the setting signal S4.

That is, the photoelectric conversion device 100 according to the present disclosure allows to control the number of detections of photons entering the SPAD 510 during one period of the periodic signal S1 using the setting signal S4. As a result, the photoelectric conversion device according to the present disclosure allows to improve the quality of images under both high illuminance and low illuminance without increasing the clock frequency for reducing incident photons and without adding an additional light reduction filter. In other words, the present disclosure can provide a photoelectric conversion device which allows a faster response to a change in illuminance. In addition, the present disclosure can provide a photoelectric conversion device which allows to simply and easily change conditions of the illuminance under which the count value of photons is saturated.

Second Embodiment

Figure 6:
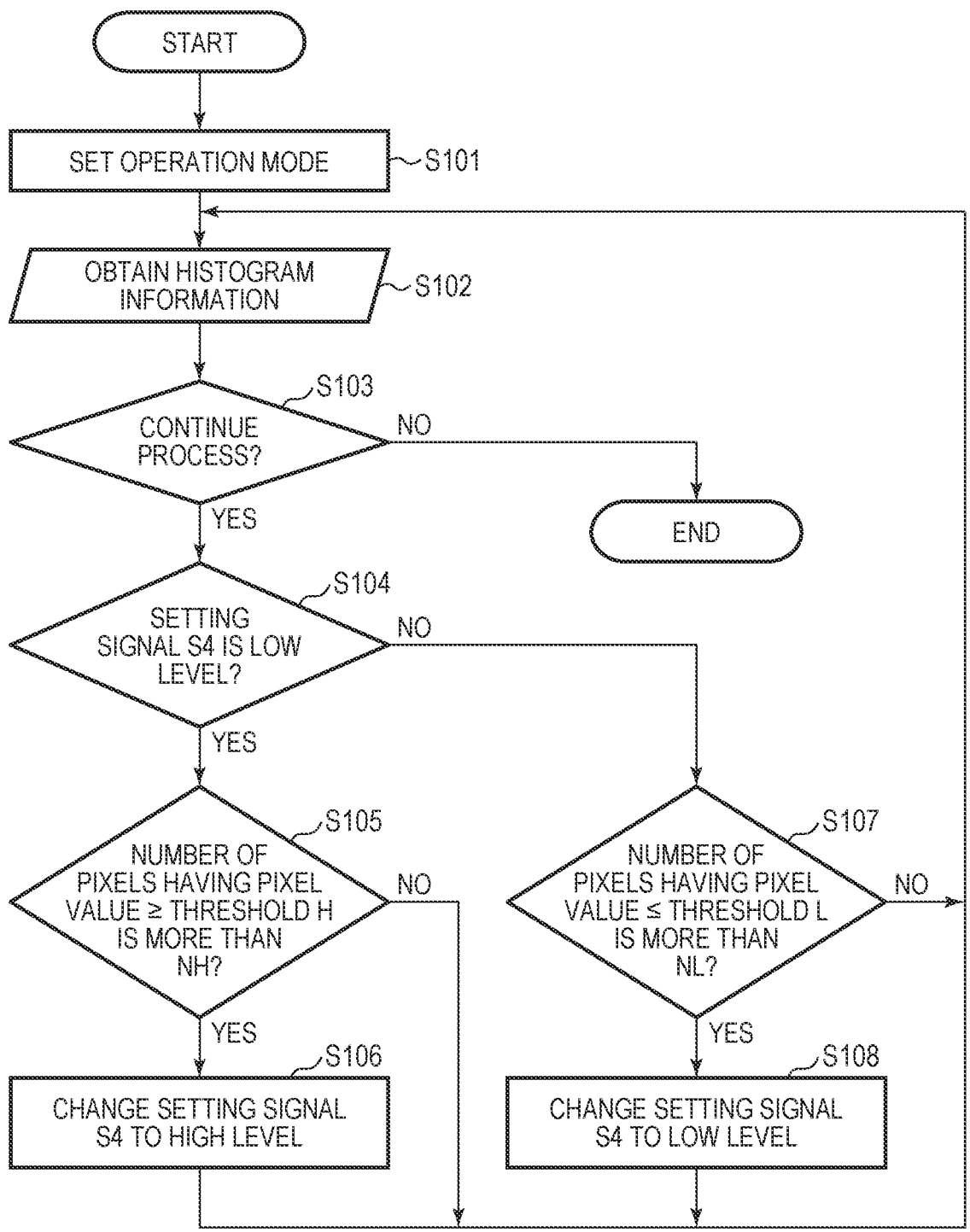
FIG. 6 illustrates a flowchart showing the operation of the imaging system according to the second embodiment.

The operation of the imaging system 110 according to the present embodiment will be described with reference to FIG. 1 and FIGS. 6 to 9. FIG. 6 is a flowchart showing the operation of the imaging system 110 according to the second embodiment. The imaging system 110 is a light detection system that captures images using different operation modes under a high illuminance environment and a low illuminance environment. The operation of the imaging system 110 based on the pixel values obtained through the photoelectric conversion device 100 will be described below.

In step S101, the general control and operation unit 116 transmits the mode signal S6 to the register block 40 of the photoelectric conversion device 100. The register block 40 transmits the setting signal S4 to the selector 550 of the pixel unit 50 based on the mode signal S6. The pixel unit 50 operates, based on the setting signal S4, in a first operation mode suitable for photographing under a high illuminance environment or in a second operation mode suitable for photographing under a low illuminance environment. The first operation mode may be set as an initial setting at the time of activating the imaging system 110. Similarly, the second operation mode may be set as an initial setting at the time of activating the imaging system 110.

Figure 7:
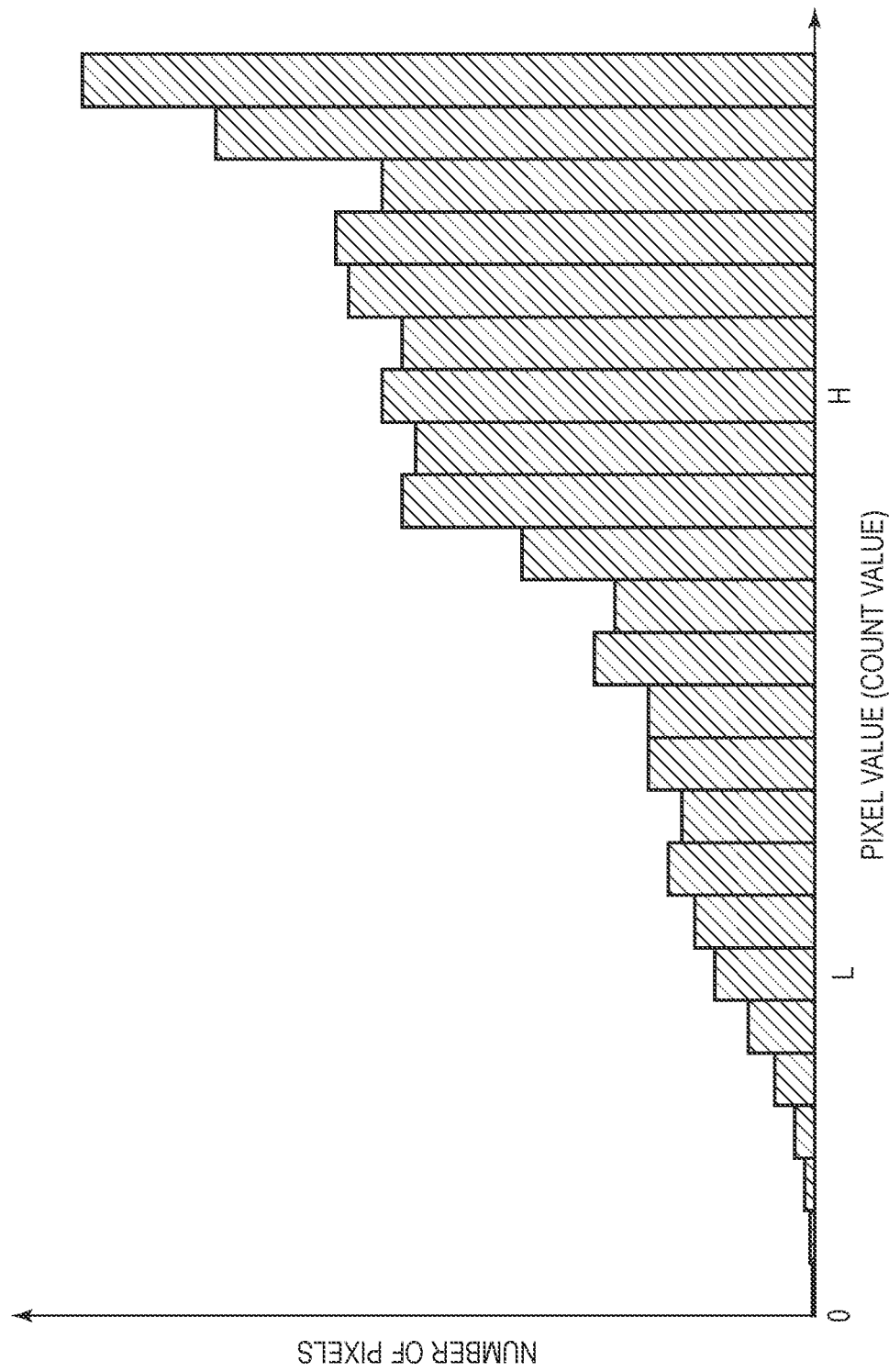
FIG. 7 illustrates a graph showing histogram information under high illuminance in the second embodiment.
Figure 8:
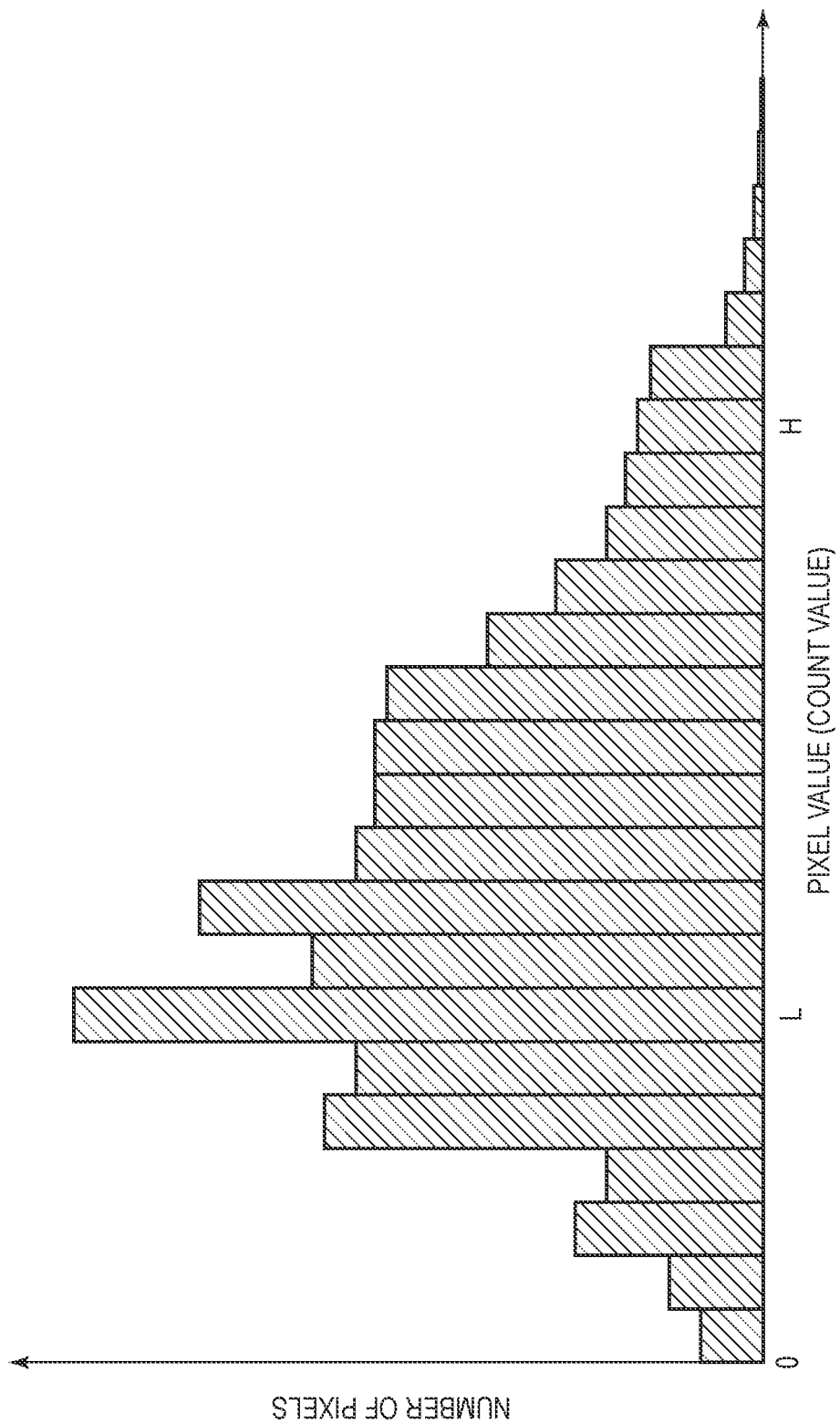
FIG. 8 illustrates a graph showing histogram information under low illuminance in the second embodiment.

In step S102, the general control and operation unit 116 acquires histogram information generated by the signal processor 114 based on the pixel signals from the photoelectric conversion device 100. In the present embodiment, the acquired histogram information indicates the total number of pixel units 50 for each pixel value obtained from the photoelectric conversion device 100 in the frame F (that is, the number of times each of multiple count values is output). In the high illuminance environment, a histogram as shown in FIG. 7 is obtained, for example. That is, under the high illuminance environment, the number of pixels peaks at a pixel value (count value) larger than a threshold value H (first threshold value), and the corresponding number of pixels tends to decrease as the pixel value decreases. Further, in the low illuminance environment, a histogram as shown in FIG. 8 is obtained, for example. That is, under the low illuminance environment, the number of pixels peaks at a pixel value (count value) in the vicinity of a threshold value L (second threshold value), and the corresponding number of pixels tends to decrease as the pixel value increases.

In step S103, the general control and operation unit 116 determines whether or not the imaging processing by the imaging system 110 is continued. Specifically, the general control and operation unit 116 receives an instruction from an external device such as a computer via the external I/F unit 120. If the instruction from the external device indicates that the processing is not continued (NO in step S103), the general control and operation unit 116 ends the present flowchart. If the instruction from the external device indicates that the processing is continued (YES in step S103), the general control and operation unit 116 advances the processing to step S104. In the processing from step S104, the general control and operation unit 116 determines the setting signal S4 for a predetermined frame (for example, frame F+3) based on the histogram information of the frame F.

In step S104, the general control and operation unit 116 determines whether or not the setting signal S4 input from the register block 40 to the pixel unit 50 is at a low level. If it is determined that the setting signal S4 is at a low level (YES in step S104), the general control and operation unit 116 determines that the imaging system 110 is operating in the second operation mode suitable for imaging under a low illuminance environment, and advances the processing to step S105.

In step S105, the general control and operation unit 116 determines whether or not to change the operation mode of the imaging system 110 based on the histogram information in the frame F. Specifically, if the general control and operation unit 116 determines that there is a predetermined number NH or more (first number or more) of the pixel units 50 that indicate the pixel values (count values) equal to or greater than the threshold value H (first threshold value or more) (YES in step S105), the general control and operation unit 116 changes the setting signal S4 output from the register block 40 to a high level in step S106. That is, the general control and operation unit 116 changes the operation mode of the imaging system 110 to the first operation mode that is suitable for imaging under a high illuminance environment, and returns the processing to step S102. On the other hand, if determining that there is less than the predetermined number NH (first number) of the pixel units 50 that indicate the pixel value (count value) equal to or greater than the threshold value H (first threshold value or more) (NO in step S105), the general control and operation unit 116 maintains the setting signal S4 output from the register block 40 at a low level. That is, the general control and operation unit 116 maintains the operation mode of the imaging system 110 in the second operation mode that is suitable for imaging under a low illuminance environment, and returns the processing to step S102.

In step S104, if the general control and operation unit 116 determines that the setting signal S4 input from the register block 40 to the pixel unit 50 is at a high level (NO in step S104), the general control and operation unit 116 determines that the imaging system 110 is operating in the first operation mode that is suitable for imaging under a high illuminance environment, and advances the processing to step S107.

In step S107, the general control and operation unit 116 determines whether or not to change the operation mode of the imaging system 110 based on the histogram information of the frame F. Specifically, if the general control and operation unit 116 determines that there is a predetermined number NL or more (the second number or more) of the pixel units 50 that indicate the pixel value (count value) equal to or less than the threshold value L (the second threshold value or less) (YES in step S107), the general control and operation unit 116 changes the setting signal S4 output from the register block 40 to a low level in step S108. That is, the general control and operation unit 116 changes the operation mode of the imaging system 110 to the second operation mode that is suitable for imaging under a low illuminance environment, and returns the processing to step S102. On the other hand, if determining that there is less than the predetermined number NL (the second number) of the pixel units 50 that indicate the pixel value (count value) equal to or less than the threshold value L (the second threshold value or less) (NO in step S107), the general control and operation unit 116 maintains the setting signal S4 output from the register block 40 at a high level. That is, the general control and operation unit 116 maintains the operation mode of the imaging system 110 in the first operation mode that is suitable for imaging under a high illuminance environment, and returns the processing to step S102.

In case that there is the predetermined number NH (first number) or more of pixels outputting pixel values (count values) equal to or greater than the threshold value H (first threshold value), the general control and operation unit 116 of the present embodiment selects the detection signal S8 generated by the circuit 530. In case that there is the predetermined number NL (second number) or more of pixels outputting pixel values (count values) equal to or less than the threshold value L (second threshold value) that is smaller than the threshold value H (first threshold value), the general control and operation unit 116 selects the detection signal S9 generated by the circuit 540. That is, the selection of the detection signal S8 corresponds to the switching to the first operation mode or the maintenance of the first operation mode. The selection of the detection signal S9 corresponds to the switching to the second operation mode or the maintenance of the second operation mode.

Figure 9:
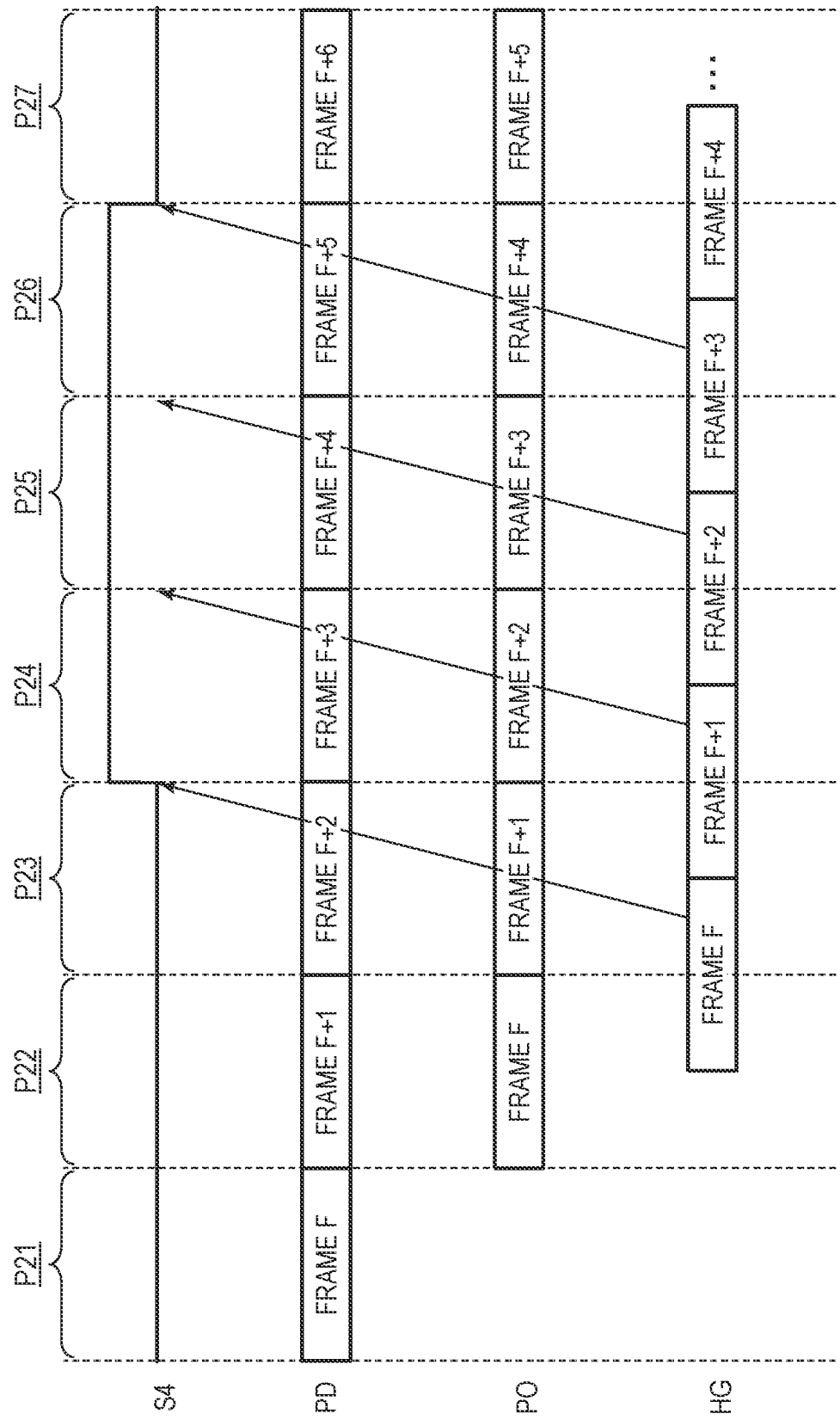
FIG. 9 illustrates a timing chart showing the operation of the imaging system according to the second embodiment.

FIG. 9 is a timing chart showing the operation of the imaging system according to the second embodiment. In the present embodiment, in each period (frame) of the periods P21 to P27 shown in FIG. 9, the photoelectric conversion device 100 detects a photon and outputs a pixel signal. Further, as shown in FIG. 9, histogram information as shown in FIGS. 7 and 8 is generated over two consecutive periods among the periods P21 to P27. FIG. 9 shows timing charts of the setting signal S4, the photon detection period PD, a pixel signal output period PO, and a histogram information generation period HG.

In the period P21, the setting signal S4 is at a low level. In the period P21, the photoelectric conversion device 100 detects the incidence of photon in the frame F. In the period P22, the pixel signal of the frame F is output from the photoelectric conversion device 100 to the signal processor 114 based on the detected photon. In a period ranging from the period P22 to the period P23, the signal processor 114 generates histogram information relating to the frame F. The generated histogram information includes, for example, the numbers of pixel units 50 that output the respective pixel values (the count values) obtained from the photoelectric conversion device 100 in the frame F, as shown in FIG. 7. The signal processor 114 transmits the generated histogram information to the general control and operation unit 116. Based on the received histogram information, the general control and operation unit 116 determines that there is the predetermined number NH (first number) or more of pixels indicating pixel values equal to or greater than the threshold value H (first threshold). Based on the determination, the general control and operation unit 116 controls the register block 40 to set the setting signal S4 for the period P24 to a high level.

Similarly, in the period P22, the setting signal S4 is at a low level. In the period P22, the photoelectric conversion device 100 detects the incidence of photon in the frame F+1. In the period P23, the pixel signal of the frame F+1 is output from the photoelectric conversion device 100 to the signal processor 114 based on the detected photon. In a period ranging from the period P23 to the period P24, the signal processor 114 generates histogram information relating to the frame F+1. The generated histogram information includes, for example, the numbers of pixel units 50 that output the respective pixel values (the count values) obtained from the photoelectric conversion device 100 in the frame F+1, as shown in FIG. 7. The signal processor 114 transmits the generated histogram information to the general control and operation unit 116. Based on the received histogram information, the general control and operation unit 116 determines that there is the predetermined number NH (first number) or more of pixels indicating the pixel values equal to or greater than the threshold value H (first threshold). Based on the determination, the general control and operation unit 116 controls the register block 40 to set the setting signal S4 for the period P25 to a high level.

Similarly, in the period P23, the setting signal S4 is at a low level. In the period P23, the photoelectric conversion device 100 detects the incidence of photon in the frame F+2. In the period P24, the pixel signal of the frame F+2 is output from the photoelectric conversion device 100 to the signal processor 114 based on the detected photon. In a period ranging from the period P24 to the period P25, the signal processor 114 generates histogram information relating to the frame F+2. The generated histogram information includes, for example, the numbers of pixel units 50 that output the respective pixel values (the count values) obtained from the photoelectric conversion device 100 in the frame F+2, as shown in FIG. 7. The signal processor 114 transmits the generated histogram information to the general control and operation unit 116. Based on the received histogram information, the general control and operation unit 116 determines that there is the predetermined number NH (first number) or more of pixels indicating the pixel values equal to or greater than the threshold value H (first threshold). Based on the determination, the general control and operation unit 116 controls the register block 40 to set the setting signal S4 for the period P26 to a high level.

In the period P24, the setting signal S4 is at a high level. In the period P24, the photoelectric conversion device 100 detects the incidence of photon in the frame F+3. In the period P25, the pixel signal of the frame F+3 is output from the photoelectric conversion device 100 to the signal processor 114 based on the detected photon. In a period ranging from the period P25 to the period P26, the signal processor 114 generates histogram information relating to the frame F+3. The generated histogram information includes, for example, the numbers of pixel units 50 that output the respective pixel values (the count values) obtained from the photoelectric conversion device 100 in the frame F+3, as shown in FIG. 8. The signal processor 114 transmits the generated histogram information to the general control and operation unit 116. Based on the received histogram information, the general control and operation unit 116 determines that there is the predetermined number NL (second number) or more of pixels indicating the pixel value equal to or less than the threshold value L (second threshold value). Based on the determination, the general control and operation unit 116 controls the register block 40 to set the setting signal S4 for the period P27 to a low level. The frame F+4 and the subsequent frames are processed in the same manner as the frame F to frame F+3, whereby the setting signal S4 is determined based on the histogram information obtained from the respective frames.

In the histogram information shown in FIGS. 7 and 8, the threshold value H holds a value different from a value held by the threshold value L. However, the threshold value H may hold the same value as the threshold value L. Further, the general control and operation unit 116 can control the register block 40 to continuously select the detection signal selected immediately before the determination (i.e., maintain the operation mode immediately before the determination) in a case where the general control and operation unit 116 determines that: there are the pixels of less than the predetermined number NH (less than the first number) outputting the pixel values (count values) equal to or greater than the threshold value H (first threshold value); and there are the pixels less than the predetermined number NL (less than the second number) outputting the pixel values (count values) equal to or less than the threshold value L (second threshold value).

In the present embodiment, the setting signal S4 to be output is determined based on the histogram information indicating the number of pixel units 50 that output each pixel value (each count value). However, the method of determining the output setting signal S4 is not limited thereto. For example, the imaging system 110 may further comprise a control circuit configured to determine the output setting signal S4 based on one or more count values obtained by the counter 560 of the photoelectric conversion device 100 within a predetermined period. That is, the detection signal S8 or the detection signal S9 can be selected by the selector 550 based on the count value obtained from the pixel unit 50 within a predetermined period or the sum of the count values. Specifically, the selector 550 may be controlled to select the detection signal S8 if the count value is equal to or greater than the first value, and may be controlled to select the detection signal S9 if the count value is less than the second value. Here, the second value may be less than the first value or may be the same value as the first value. If it is determined that the count value is smaller than the first value and larger than the second value, the selector 550 may be controlled to continuously select the detection signal selected immediately before the determination.

Further, the imaging system 110 may cause an external device of the imaging system 110 to perform a determination for switching the setting signal S4, receive a result of the determination via the external I/F unit 120, and the general control and operation unit 116 may control the register block 40 for outputting the setting signal S4 based on the result of the determination. Further, in the present embodiment, the determination for switching the setting signal S4 is made based on the pixel signal output from the photoelectric conversion device 100. However, the method of determining whether to switch the setting signal S4 is not limited thereto. For example, the imaging system 110 may measure the amount of incident photons (the amount of incident light) via an external light amount sensor or the like, receive the result of the measurement, and the general control and operation unit 116 may control the register block 40 that outputs the setting signal S4 based on the result of the measurement. Further, in the present embodiment, the setting signal S4 is determined based on the histogram information of the preceding three frames, but the operation of the imaging system 110 according to the present disclosure is not limited to the above configuration. For example, a circuit capable of reducing the delay of signals may be used, or measurement values of the light amount via a separate light amount sensor or the like may be used. The setting signal S4 may be determined based on the histogram information (count values) at least one frame before, and the detection signal may be selected based on the determined setting signal S4 using the above circuit or the above separate light amount sensor.

Third Embodiment

The configuration of the photoelectric conversion device according to the present embodiment will be described with reference to FIGS. 10 to 13. The photoelectric conversion device includes SPAD pixels including an avalanche photodiode (hereinafter referred to as "APD"). Of a pair of the charges generated in the APD, the conductivity type of the charge used as the signal charge is referred to as a first conductivity type. The first conductivity type refers to a conductivity type in which a charge having the same polarity as the signal charge is used as a majority carrier. Further, a conductivity type opposite to the first conductivity type is referred to as a second conductivity type. Although an example in which the signal charges are electrons, the first conductivity type is the N-type, and the second conductivity type is the P-type will be described below, the signal charges may be holes, the first conductivity type may be the P-type, and the second conductivity type may be the N-type.

Figure 10:
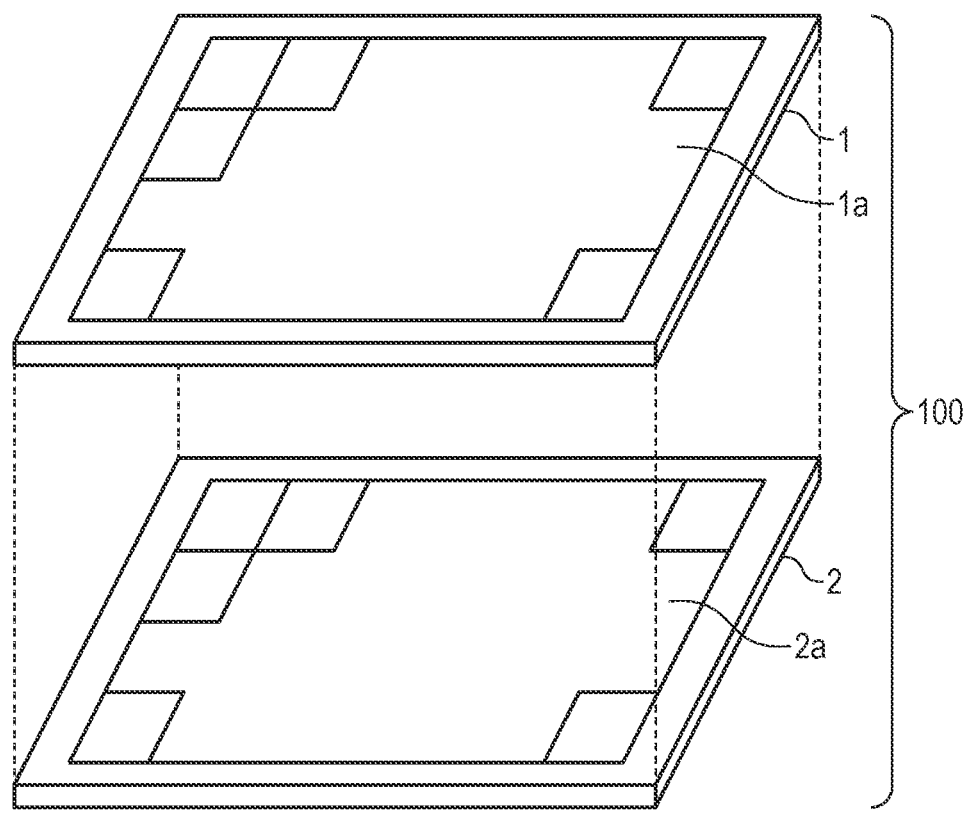
FIG. 10 illustrates a schematic diagram of the photoelectric conversion device according to the third embodiment.

FIG. 10 is a schematic diagram of a photoelectric conversion device according to the present embodiment, and shows a configuration of a stacked photoelectric conversion device 100. The photoelectric conversion device 100 includes a sensor substrate (first substrate) 1 and a circuit substrate (second substrate) 2 stacked on each other, and the sensor substrate 1 and the circuit substrate 2 are electrically connected to each other. The photoelectric conversion device according to the present embodiment is a back-illuminated photoelectric conversion device in which light is incident from a first surface of the sensor substrate 1 and the circuit substrate 2 is arranged on a second surface of the sensor substrate 1. The sensor substrate 1 includes a first semiconductor layer having photoelectric conversion elements described later and a first wiring structure. The circuit substrate 2 includes a second semiconductor layer having a circuit such as a signal processing unit described later and a second wiring structure. The photoelectric conversion device 100 is formed by stacking the second semiconductor layer, the second wiring structure, the first wiring structure, and the first semiconductor layer in this order.

Hereinafter, the sensor substrate 1 and the circuit substrate 2 may be diced chips, but are not limited to chips. For example, each of the substrates may be a wafer. Further, each substrate may be diced after being laminated in a wafer state, or chips may be stacked and bonded after being formed into chips. The sensor substrate 1 is provided with a pixel region 1a, and the circuit substrate 2 is provided with a circuit region 2a for processing a signal detected by the pixel region 1a.

Figure 11:
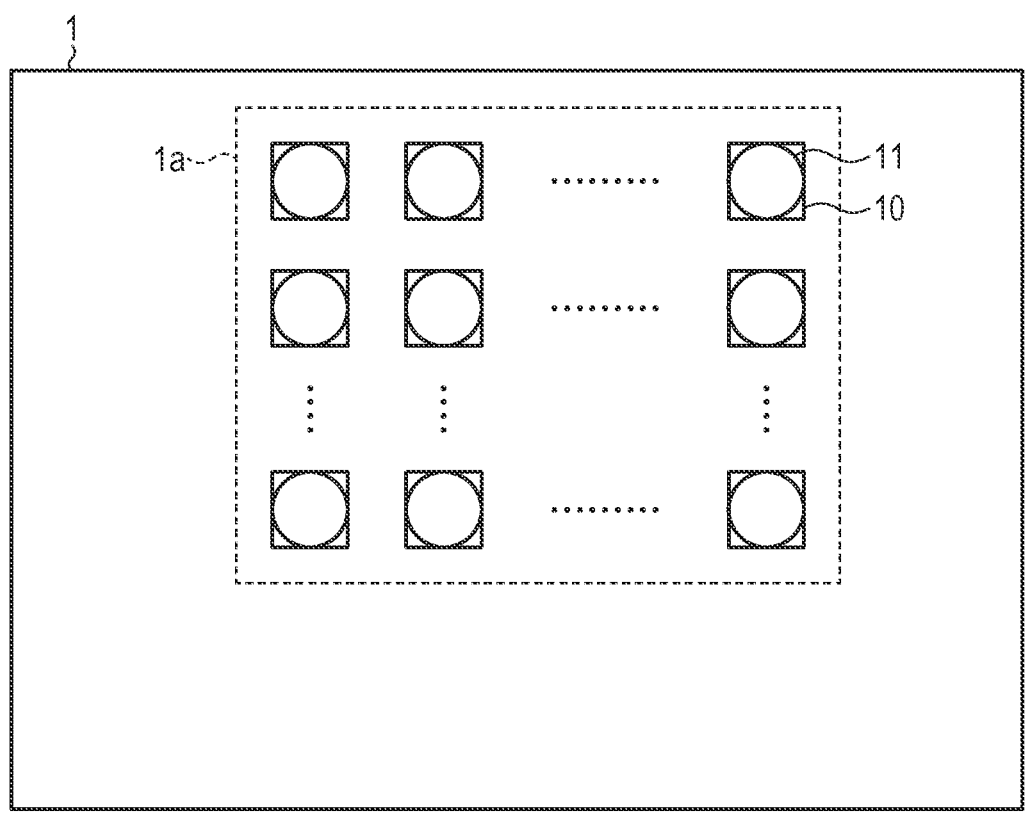
FIG. 11 illustrates a diagram showing an arrangement example of the sensor substrate according to the third embodiment.

FIG. 11 is a diagram illustrating an arrangement example of the sensor substrate 1. The plurality of pixels 10 each include an APD 11, and are arranged in a two-dimensional array in a plan view to form a pixel region 1a.

The pixel 10 is typically a pixel for forming an image, but when it is used in a TOF (Time of Flight), the pixel 10 does not necessarily need to form an image. That is, the pixel 10 may be a pixel for measuring the time at which light reaches and the amount of light.

Figure 12:
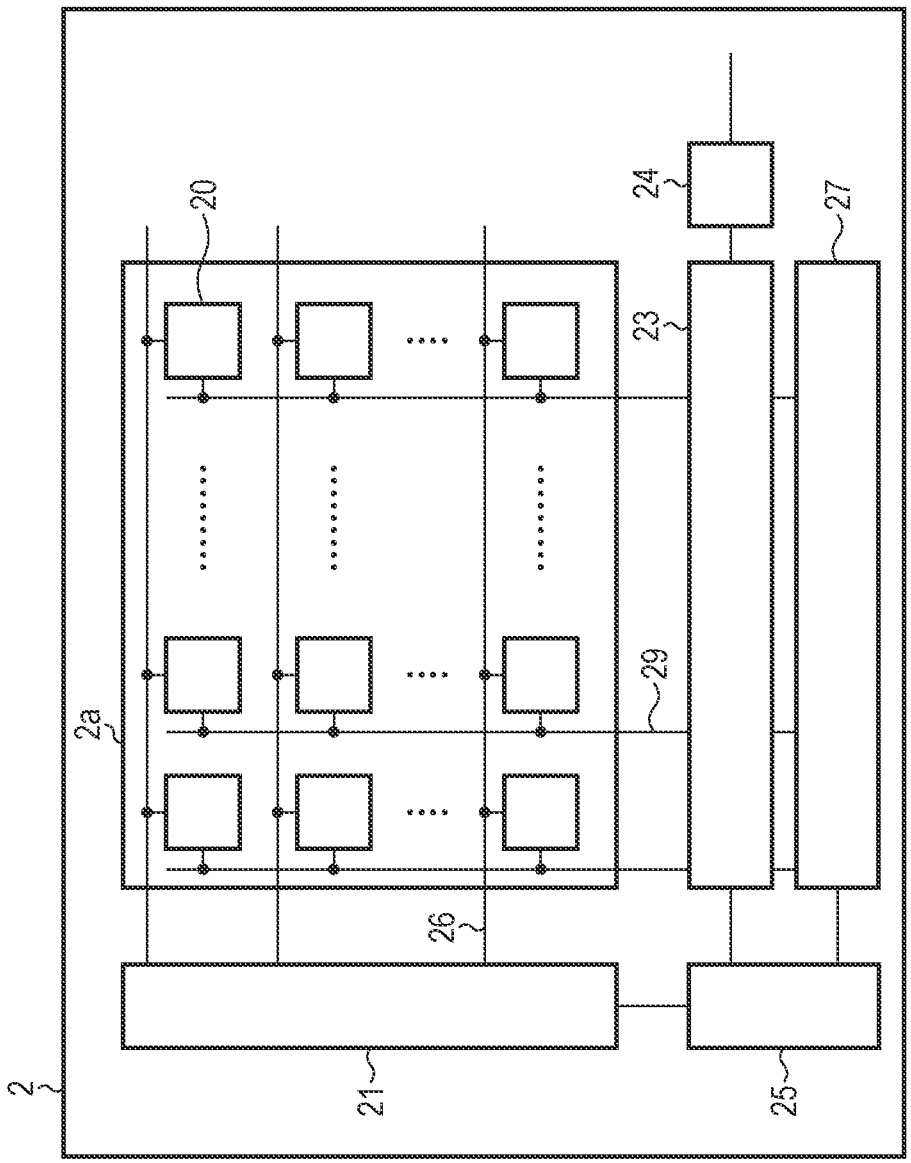
FIG. 12 illustrates a diagram showing an arrangement example of the circuit board according to the third embodiment.

FIG. 12 is a diagram illustrating an arrangement example of the circuit substrate 2. The circuit substrate 2 includes a signal processing unit 20, a vertical scanning circuit 21, a readout circuit 23, a horizontal scanning circuit 27, an output calculation unit 24, a control pulse generation circuit 25, a scanning line 26, and a signal line 29. The circuit region 2a is arranged in a region overlapping the pixel region 1a in FIG. 11 in a plan view. Further, in the plan view in FIG. 11, the vertical scanning circuit 21, the readout circuit 23, the horizontal scanning circuit 27, the output calculation unit 24, and the control pulse generation circuit 25 are disposed to overlap with a region between the edge of the sensor substrate 1 and the edge of the pixel region 1a. That is, the sensor substrate 1 has a pixel region 1a and a non-pixel region arranged around the pixel region 1a, and the vertical scanning circuit 21, the readout circuit 23, the horizontal scanning circuit 27, the output calculation unit 24, and the control pulse generation circuit 25 are arranged in a region overlapping the non-pixel region in a plan view.

The signal processing units 20 are electrically connected to the pixels 10 through connection wirings each provided for the pixel 10, and are arranged in a two-dimensional array in a plan view, similarly to the pixels 10. The signal processing unit 20 includes a binary counter that counts photons incident on the pixel 10.

The vertical scanning circuit 21 receives a control pulse supplied from the control pulse generation circuit 25, and supplies the control pulse to the signal processing unit 20 corresponding to the pixels 10 in each row via the scanning line 26. The vertical scanning circuit 21 may include a logic circuit such as a shift register or an address decoder.

The readout circuit 23 acquires a pulse count value of a digital signal from the signal processing unit 20 of each row via the signal line 29. Then, an output signal is output to a signal processing circuit (signal processing device) outside the photoelectric conversion device 100 via the output calculation unit 24. The readout circuit 23 may have a function of a signal processing circuit for correcting the pulse count value or the like. The horizontal scanning circuit 27 receives the control pulse from the control pulse generation circuit 25, and sequentially outputs the pulse count value of each column in the readout circuit 23 to the output calculation unit 24. As described later, when the pulse count value exceeds a threshold value, the output calculation unit 24 estimates an actual image signal (pulse count value) based on the time count value included in additional information and the threshold value, and replaces (extrapolates) the pulse count value with the estimated pulse count value. On the other hand, when the pulse count value is equal to or smaller than the threshold value, the pulse count value is output as an image signal as it is.

The output calculation unit 24 performs a predetermined process on the pulse count value read by the readout circuit 23, and outputs an image signal to the outside. As will be described later, when the pulse count value exceeds the threshold value, the output calculation unit 24 can perform processing such as calculation of the pulse count value.

In FIG. 11, the arrangement of photoelectric conversion elements in the pixel region 1a may be one-dimensionally arranged. In addition, the effect of the present disclosure can be achieved even in a configuration in which a single pixel 10 is provided, and a configuration in which a single pixel 10 is provided can be included in the present disclosure. In the photoelectric conversion device having a plurality of pixels 10, the effect of suppressing the circuit scale according to the present embodiment becomes more significant. It is not necessary to provide one signal processing unit 20 for every pixel 10. For example, one signal processing unit 20 may be shared by a plurality of pixels 10 and signal processing may be sequentially performed.

Figure 13:
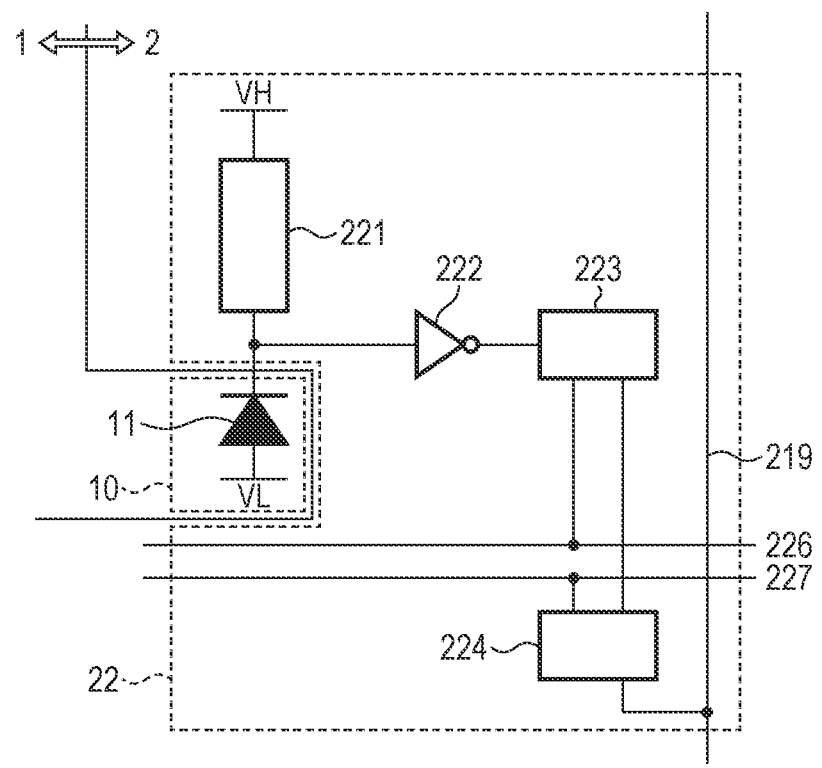
FIG. 13 illustrates a circuit diagram of the avalanche photo diode (APD) and the pulse generator according to the third embodiment.

FIG. 13 is a block diagram of the APD and a pulse generation unit according to the present embodiment. FIG. 13 illustrates the pixels 10 of the sensor substrate 1 and a pulse generation unit 22 in the signal processing unit 20 of the circuit substrate 2. The APD 11 is disposed in the pixel 10. The pulse generation unit 22 includes a quenching element 221, a waveform shaping unit 222, a counter circuit 223, and a selection circuit 224.

The APD 11 generates charge pairs corresponding to incident light by photoelectric conversion. A voltage VL (first voltage) is supplied to an anode of the APD 11. A voltage VH (second voltage) higher than the voltage VL supplied to the anode is supplied to a cathode of the APD 11. A reverse bias voltage is applied to the anode and the cathode, and the APD 11 is in a state capable of avalanche multiplication. When photons enter the APD 11 in a state where the reverse bias voltage is supplied, charges generated by the photons cause avalanche multiplication, and an avalanche current is generated.

The APD 11 can operate in the Geiger mode or the linear mode according to the voltage of the reverse bias. The Geiger mode is an operation in a state where the potential difference between the anode and the cathode is higher than the breakdown voltage, and the linear mode is an operation in a state where the potential difference between the anode and the cathode is near or lower than a breakdown voltage. An APD operating in the Geiger mode is particularly referred to as SPAD or SPAD-type. As an example, the voltage VL (first voltage) may be −30 V and the voltage VH (second voltage) may be 1 V. The APD 11 may operate in a linear mode or a Geiger mode. When the APD 11 operates as the SPAD, the potential difference becomes larger than that of the APD 11 in the linear mode, and the effect of the withstand voltage becomes significant. Accordingly, the SPAD is preferable in this case.

The quenching element 221 is provided between the power supply line for supplying the voltage VH and the cathode of the APD 11. The quenching element 221 functions as a load circuit (quenching circuit) at the time of signal multiplication by avalanche multiplication, and has a function of suppressing a voltage supplied to the APD 11 and suppressing avalanche multiplication (quenching operation). Further, the quenching element 221 has a function of returning the voltage supplied to the APD 11 to the voltage VH by flowing a current corresponding to the voltage drop in the quenching operation (recharging operation).

The waveform shaping unit 222 functions as a signal generation unit that generates a detection pulse based on an output generated by incidence of a photon. That is, the waveform shaping unit 222 shapes the potential change of the cathode of the APD 11 obtained at the time of photon detection, and outputs a rectangular wave pulse signal (detection pulse). As the waveform shaping unit 222, for example, an inverter circuit is used. Although FIG. 13 shows an example in which one inverter is used as the waveform shaping unit 222, a circuit having a plurality of inverters are connected in series may be used. Other circuits having a waveform shaping effect may also be used.

The counter circuit 223 counts the pulse signals output from the waveform shaping unit 222 and holds the count value. Further, a control pulse is supplied from the vertical scanning circuit 21 shown in FIG. 12 to the counter circuit 223 through a driving line 226 included in the scanning line 26. When the control pulse becomes active, the signal held in the counter circuit 223 is reset.

The selection circuit 224 includes a switch circuit, a buffer circuit for outputting a signal, and the like. The selection circuit 224 is supplied with a control pulse from the vertical scanning circuit 21 shown in FIG. 12 through a driving line 227. In accordance with the control pulse, the selection circuit 224 electrically switches a connected state or a non-connected state between the counter circuit 223 and a signal line 219.

A switch such as a transistor may be provided between the quenching element 221 and the APD 11, and between the APD 11 and the signal processing unit 20. Alternatively, the supply of the voltage VH or the voltage VL may be electrically switched by a switch such as a transistor.

Figure 14A:
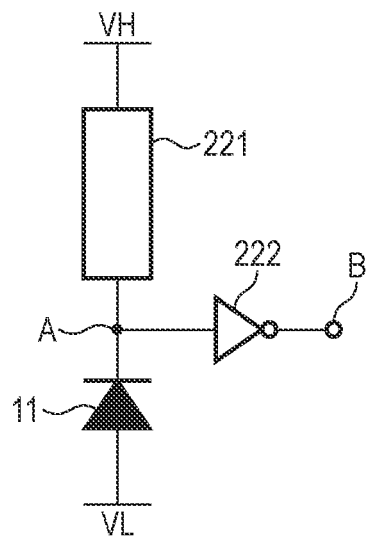
FIG. 14A illustrates a diagram showing the relation between the operation of the APD and the output signal in the third embodiment.
Figure 14B:
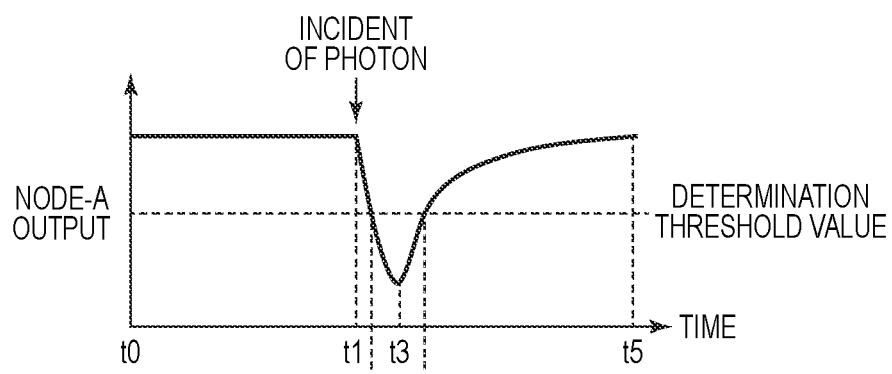
FIG. 14B illustrates a diagram showing the relation between the operation of the APD and the output signal in the third embodiment.
Figure 14C:
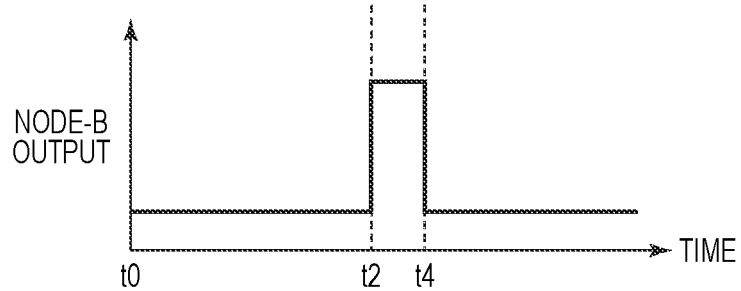
FIG. 14C illustrates a diagram showing the relation between the operation of the APD and the output signal in the third embodiment.

FIGS. 14A, 14B, and 14C are diagrams illustrating the relationship between the operation of the APD and the output signal in the present embodiment. FIG. 14A is a diagram extracted from the APD 11, the quenching element 221, and the waveform shaping unit 222 in FIG. 13. When the input side and the output side of the waveform shaping unit 222 are node A and node B, FIG. 14B illustrates a waveform change of node A and FIG. 14C illustrates a waveform change of node B.

In a period from time t0 to time t1, a reverse bias voltage of VH-VL is applied to the APD 11. When a photon is incident on the APD 11 at the time t1, avalanche multiplication occurs in the APD 11, an avalanche multiplication current flows in the quenching element 221, and the voltage of node A drops. When the voltage drop further increases and the potential difference applied to the APD 11 decreases, the avalanche multiplication of the APD 11 stops at time t3, and the voltage level of the node A does not drop by a certain constant value or more. After that, in a period from time t3 to time t5, a current that compensates a voltage drop from the voltage VL flows through the node A, and at the time t5, the node A is settled to the original voltage level. In this case, from time t2 to time t4, when the voltage level of the node A is lower than the threshold value of the waveform shaping unit 222, the node B becomes high level. That is, the voltage waveform of node A is shaped by the waveform shaping unit 222, and a rectangular wave pulse signal is output from node B.

Fourth Embodiment

Figure 15:
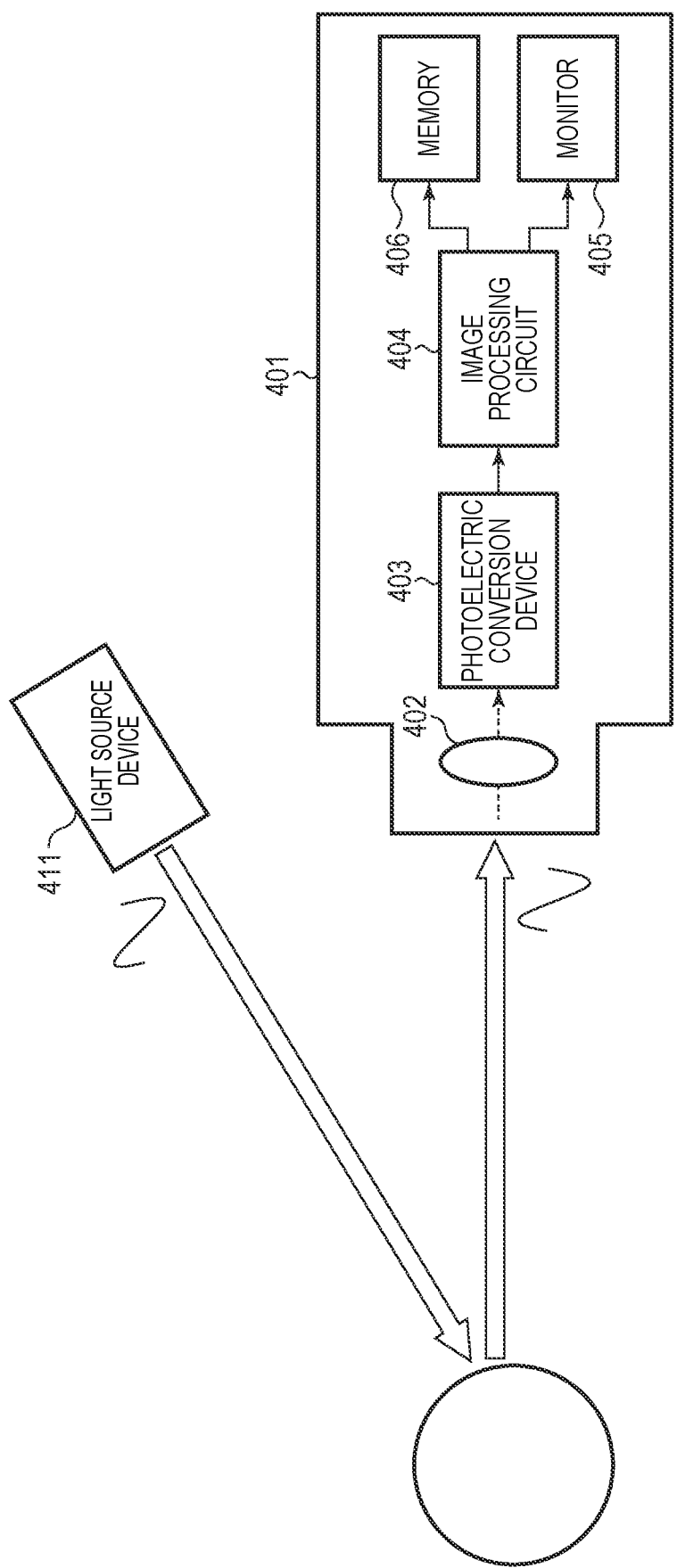
FIG. 15 illustrates a block diagram of the light detection system according to the fourth embodiment.

FIG. 15 is a block diagram of a photodetection system according to the present embodiment. More specifically, FIG. 15 is a block diagram of a ranging image sensor using the photoelectric conversion device according to the present embodiments.

As illustrated in FIG. 15, a ranging image sensor 401 includes an optical system 402, a photoelectric conversion device 403, an image processing circuit 404, a monitor 405, and a memory 406. The ranging image sensor 401 receives light (modulated light, pulsed light) emitted from a light source device 411 toward an object and reflected by the surface of the object. The ranging image sensor 401 can acquire a distance image corresponding to the distance to the object based on the time from light emission to light reception.

The optical system 402 includes one or a plurality of lenses, guides image light (incident light) from the object to the photoelectric conversion device 403, and forms an image on a light receiving surface (sensor portion) of the photoelectric conversion device 403.

As the photoelectric conversion device 403, the photoelectric conversion device of each of the above embodiments can be applied. The photoelectric conversion device 403 supplies a distance signal indicating a distance obtained from the received light signal to the image processing circuit 404.

The image processing circuit 404 performs image processing for forming a distance image based on the distance signal supplied from the photoelectric conversion device 403. The distance image (image data) obtained by image processing can be displayed on the monitor 405 and stored (recorded) in the memory 406.

By applying the photoelectric conversion device described above to the ranging image sensor 401 configured as described above, a more accurate distance image can be acquired.

Fifth Embodiment

The technology according to the present disclosure can be applied to various products. For example, techniques according to the present disclosure may be applied to endoscope surgery systems which is an example of the photodetection system.

Figure 16:
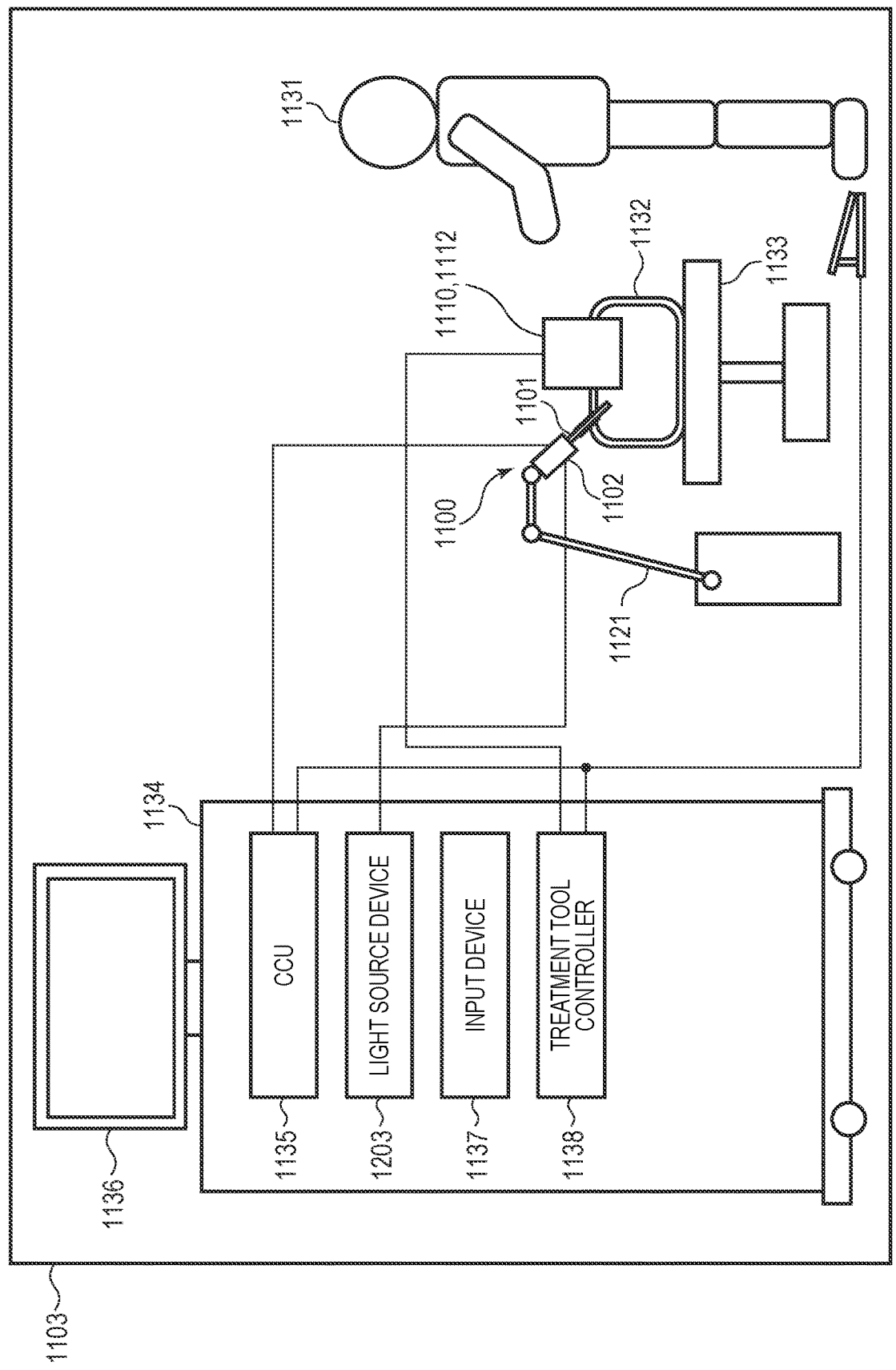
FIG. 16 illustrates a schematic diagram of the endoscopic surgery system according to the fifth embodiment.

FIG. 16 is a schematic view of an endoscope surgery system according to the present embodiment. FIG. 16 shows a state in which an operator (physician) 1131 performs surgery on a patient 1132 on a patient bed 1133 using an endoscope surgery system 1103. As shown, the endoscope surgery system 1103 includes an endoscope 1100, a surgery tool 1110, and a cart 1134 on which various devices for endoscopic surgery are mounted.

The endoscope 1100 includes a lens barrel 1101 in which an area of a predetermined length from the distal end is inserted into the body cavity of the patient 1132, a camera head 1102 connected to the proximal end of the lens barrel 1101, and an arm 1121. Although FIG. 16 illustrates the endoscope 1100 configured as a so-called rigid scope having the rigid lens barrel 1101, the endoscope 1100 may be configured as a so-called flexible scope having a flexible lens barrel.

An opening into which an objective lens is fitted is provided at a distal end of the lens barrel 1101. A light source device 1203 is connected to the endoscope 1100. Light generated by the light source device 1203 is guided to the distal end of the barrel by a light guide extended inside the lens barrel 1101, and is irradiated toward an observation target in the body cavity of the patient 1132 via an objective lens. The endoscope 1100 may be a straight-viewing scope an oblique-viewing scope, or a side-viewing scope.

An optical system and a photoelectric conversion device are provided inside the camera head 1102, and reflected light (observation light) from an observation target is focused on the photoelectric conversion device by the optical system. The observation light is photoelectrically converted by the photoelectric conversion device, and an electric signal corresponding to the observation light, that is, an image signal corresponding to the observation image is generated. As the photoelectric conversion device, the photoelectric conversion device described in each of the above embodiments can be used. The image signal is transmitted to a camera control unit (CCU) 1135 as RAW data.

The CCU 1135 includes a central processing unit (CPU), a graphics processing unit (GPU), and the like, and controls overall operations of the endoscope 1100 and a display device 1136. Further, the CCU 1135 receives an image signal from the camera head 1102, and performs various kinds of image processing for displaying an image based on the image signal, such as development processing (demosaic processing).

The display device 1136 displays an image based on the image signal subjected to the image processing by the CCU 1135 under the control of the CCU 1135.

The light source device 1203 includes, for example, a light source such as a light emitting diode (LED), and supplies irradiation light to the endoscope 1100 when capturing an image of an operating part or the like.

An input device 1137 is an input interface to the endoscope surgery system 1103. The user can input various types of information and input instructions to the endoscope surgery system 1103 via the input device 1137.

A treatment tool controller 1138 controls the actuation of an energy treatment tool 1112 for ablation of tissue, incision, sealing of blood vessels, etc.

The light source device 1203 is capable of supplying irradiation light to the endoscope 1100 when capturing an image of the surgical site, and may be, for example, a white light source formed by an LED, a laser light source, or a combination thereof. When a white light source is configured by a combination of RGB laser light sources, the output intensity and output timing of each color (each wavelength) can be controlled with high accuracy. Therefore, the white balance of the captured image can be adjusted in the light source device 1203. In this case, laser light from each of the RGB laser light sources may be irradiated onto the observation target in a time-division manner, and driving of the image pickup device of the camera head 1102 may be controlled in synchronization with the irradiation timing. Thus, images corresponding to R, G, and B can be captured in a time-division manner. According to this method, a color image can be obtained without providing a color filter in the image pickup device.

The driving of the light source device 1203 may be controlled such that the intensity of light output from the light source device 1203 is changed at predetermined time intervals. By controlling the driving of the image pickup device of the camera head 1102 in synchronization with the timing of changing the intensity of light to acquire an image in a time-division manner, and by synthesizing the images, it is possible to generate an image in a high dynamic range without so-called blackout and whiteout.

Further, the light source device 1203 may be configured to be able to supply light in a predetermined wavelength band corresponding to special light observation. In special light observation, for example, the wavelength dependence of light absorption in body tissue can be used. Specifically, a predetermined tissue such as a blood vessel in the surface layer of the mucosa is imaged with high contrast by irradiating light in a narrow band compared to the irradiation light (i.e., white light) during normal observation. Alternatively, in special light observation, fluorescence observation for obtaining an image by fluorescence generated by irradiation with excitation light may be performed. In the fluorescence observation, excitation light can be irradiated to the body tissue to observe fluorescence from the body tissue, or a reagent such as indocyanine green (ICG) can be locally injected into the body tissue and the body tissue can be irradiated with excitation light corresponding to the fluorescence wavelength of the reagent to obtain a fluorescence image. The light source device 1203 may be configured to be able to supply narrowband light and/or excitation light corresponding to such special light observation.

Sixth Embodiment

A light detection system and A movable body of the present embodiment will be described with reference to FIGS. 17A, 17B, 17C, 17D and 18. In the present embodiment, an example of an in-vehicle camera is illustrated as a light detection system.

Figure 17A:
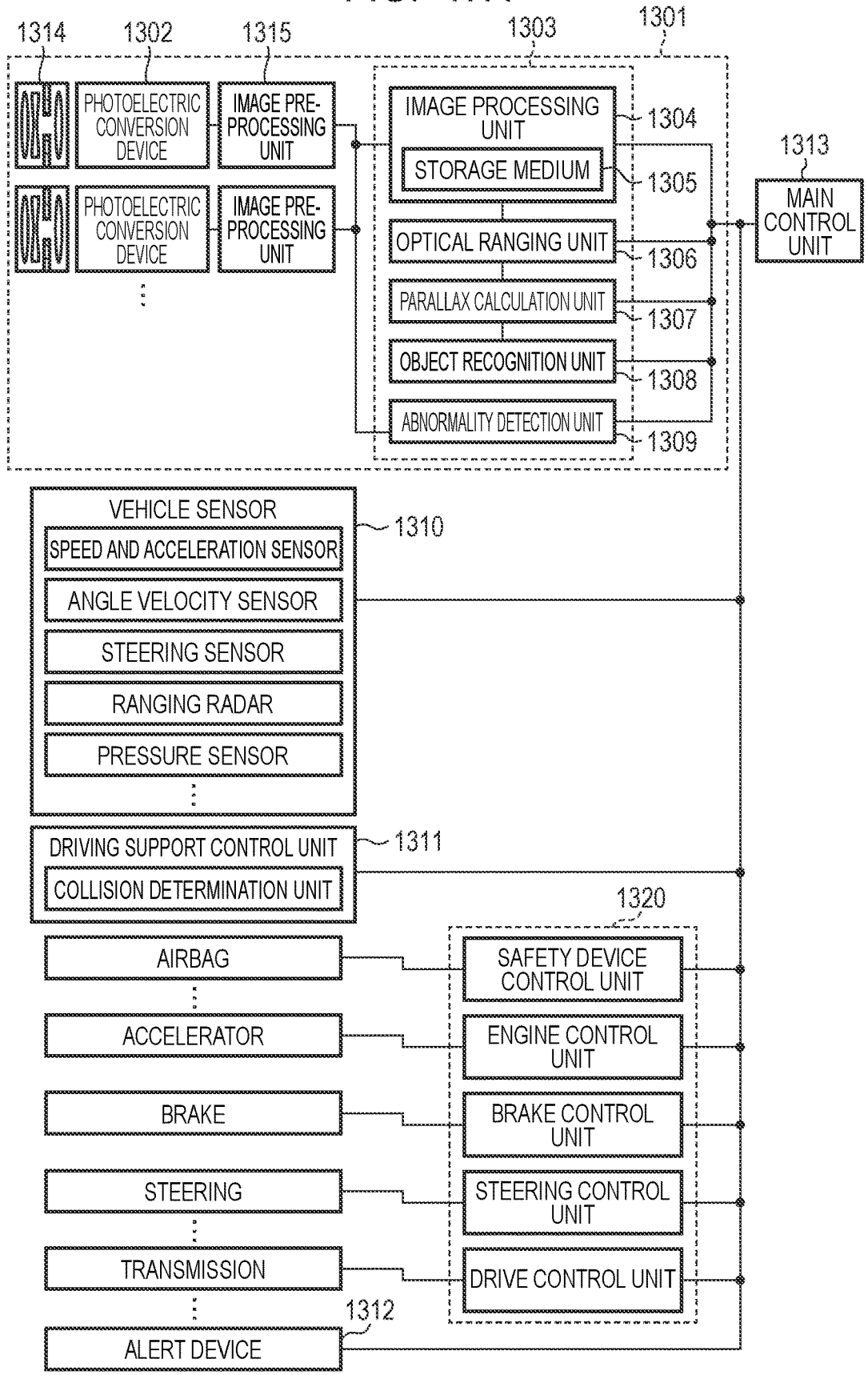
FIG. 17A illustrates a schematic diagram of the light detection system according to the sixth embodiment.
Figure 17B:
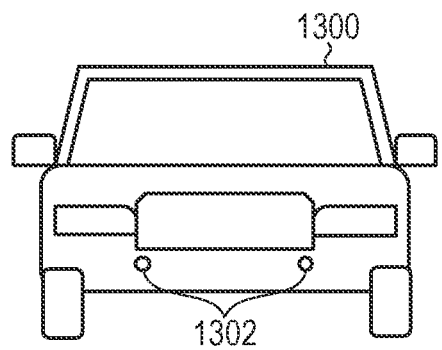
FIG. 17B illustrates a schematic diagram of the movable body according to the sixth embodiment.
Figure 17C:
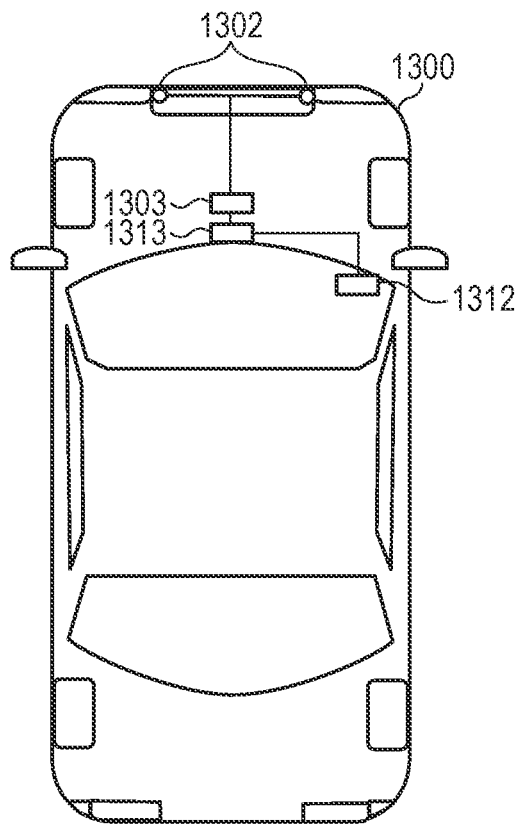
FIG. 17C illustrates a schematic diagram of the movable body according to the sixth embodiment.
Figure 17D:
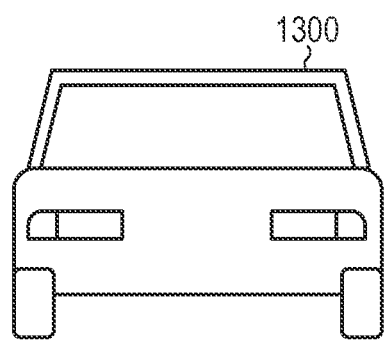
FIG. 17D illustrates a schematic diagram of the movable body according to the sixth embodiment.

FIG. 17A is a schematic diagram of a light detection system according to the present embodiment. More specifically, FIGS. 17B, 17C and 17D illustrate an example of a vehicle system and a light detection system mounted on the vehicle system. A light detection system 1301 includes photoelectric conversion devices 1302, image pre-processing units 1315, an integrated circuit 1303, and optical systems 1314. The optical system 1314 forms an optical image of an object on the photoelectric conversion device 1302. The photoelectric conversion device 1302 converts the optical image of the object formed by the optical system 1314 into an electric signal. The photoelectric conversion device 1302 is the photoelectric conversion device of any one of the above-described embodiments. The image pre-processing unit 1315 performs predetermined signal processing on the signal output from the photoelectric conversion device 1302. The function of the image pre-processing unit 1315 may be incorporated in the photoelectric conversion device 1302. The light detection system 1301 is provided with at least two sets of the optical system 1314, the photoelectric conversion device 1302, and the image pre-processing unit 1315, and an output signal from the image pre-processing units 1315 of each set is input to the integrated circuit 1303.

The integrated circuit 1303 is an integrated circuit for use in an imaging system. The integrated circuit 1303 includes an image processing unit 1304 including a storage medium 1305, an optical ranging unit 1306, a parallax calculation unit 1307, an object recognition unit 1308, and an abnormality detection unit 1309. The image processing unit 1304 performs image processing such as development processing and defect correction on the output signal of the image pre-processing unit 1315. The storage medium 1305 performs primary storage of captured images and stores defect positions of image capturing pixels. The optical ranging unit 1306 focuses or measures the object. The parallax calculation unit 1307 calculates distance measurement information from the plurality of image data acquired by the plurality of photoelectric conversion devices 1302. The object recognition unit 1308 recognizes an object such as a car, a road, a sign, or a person. When the abnormality detection unit 1309 detects the abnormality of the photoelectric conversion device 1302, the abnormality detection unit 1309 issues an abnormality to a main control unit 1313.

The integrated circuit 1303 may be realized by dedicated hardware, a software module, or a combination thereof. It may be realized by a field programmable gate array (FPGA), an application specific integrated circuit (ASIC), or the like, or may be realized by a combination of these.

The main control unit 1313 (movable body controller) controls overall operations of the light detection system 1301, a vehicle sensor 1310, a control unit 1320, and the like. Without the main control unit 1313, the light detection system 1301, the vehicle sensor 1310, and the control unit 1320 may individually have a communication interface, and each of them may transmit and receive control signals via a communication network, for example, according to the CAN (Controller Area Network) standard.

The integrated circuit 1303 has a function of transmitting a control signal or a setting value to the photoelectric conversion device 1302 by receiving a control signal from the main control unit 1313 or by its own control unit.

The light detection system 1301 is connected to the vehicle sensor 1310, and can detect a traveling state of the host vehicle such as a vehicle speed, a yaw rate, a steering angle, and the like, an environment outside the host vehicle, and states of other vehicles and obstacles. The vehicle sensor 1310 is also a distance information acquisition unit that acquires distance information to the object. The light detection system 1301 is connected to a driving support control unit 1311 that performs various driving support functions such as an automatic steering function, an automatic cruise function, and a collision prevention function. Particularly, regarding the collision determination function, based on detection results of the light detection system 1301 and the vehicle sensor 1310, it is determined whether or not there is a possibility or occurrence of collision with another vehicle or an obstacle. Thus, avoidance control is performed when a possibility of collision is estimated and a safety device is activated when collision occurs.

The light detection system 1301 is also connected to an alert device 1312 that issues an alarm to a driver based on a determination result of the collision determination unit. For example, when the possibility of collision is high as the determination result of the collision determination unit, the main control unit 1313 performs vehicle control such as braking, returning an accelerator, suppressing engine output, or the like, thereby avoiding collision or reducing damage. The alert device 1312 issues a warning to a user using means such as an alarm of a sound or the like, a display of alarm information on a display unit screen such as a car navigation system and a meter panel, and a vibration application to a seatbelt and a steering wheel.

The light detection system 1301 according to the present embodiment can capture an image around the vehicle, for example, the front or the rear. FIGS. 17B, 17C, and 17D are schematic diagrams of a movable body according to the present embodiment, and illustrate a configuration in which an image of the front of the vehicle is captured by the light detection system 1301.

The two photoelectric conversion devices 1302 are arranged in front of a vehicle 1300. Specifically, it is preferable that a center line with respect to a forward/backward direction or an outer shape (for example, a vehicle width) of the vehicle 1300 be regarded as a symmetry axis, and the two photoelectric conversion devices 1302 be arranged in line symmetry with respect to the symmetry axis. This makes it possible to effectively acquire distance information between the vehicle 1300 and the object to be imaged and determine the possibility of collision. Further, it is preferable that the photoelectric conversion device 1302 be arranged at a position where it does not obstruct the field of view of the driver when the driver sees a situation outside the vehicle 1300 from the driver's seat. The alert device 1312 is preferably arranged at a position that is easy to enter the field of view of the driver.

Figure 18:
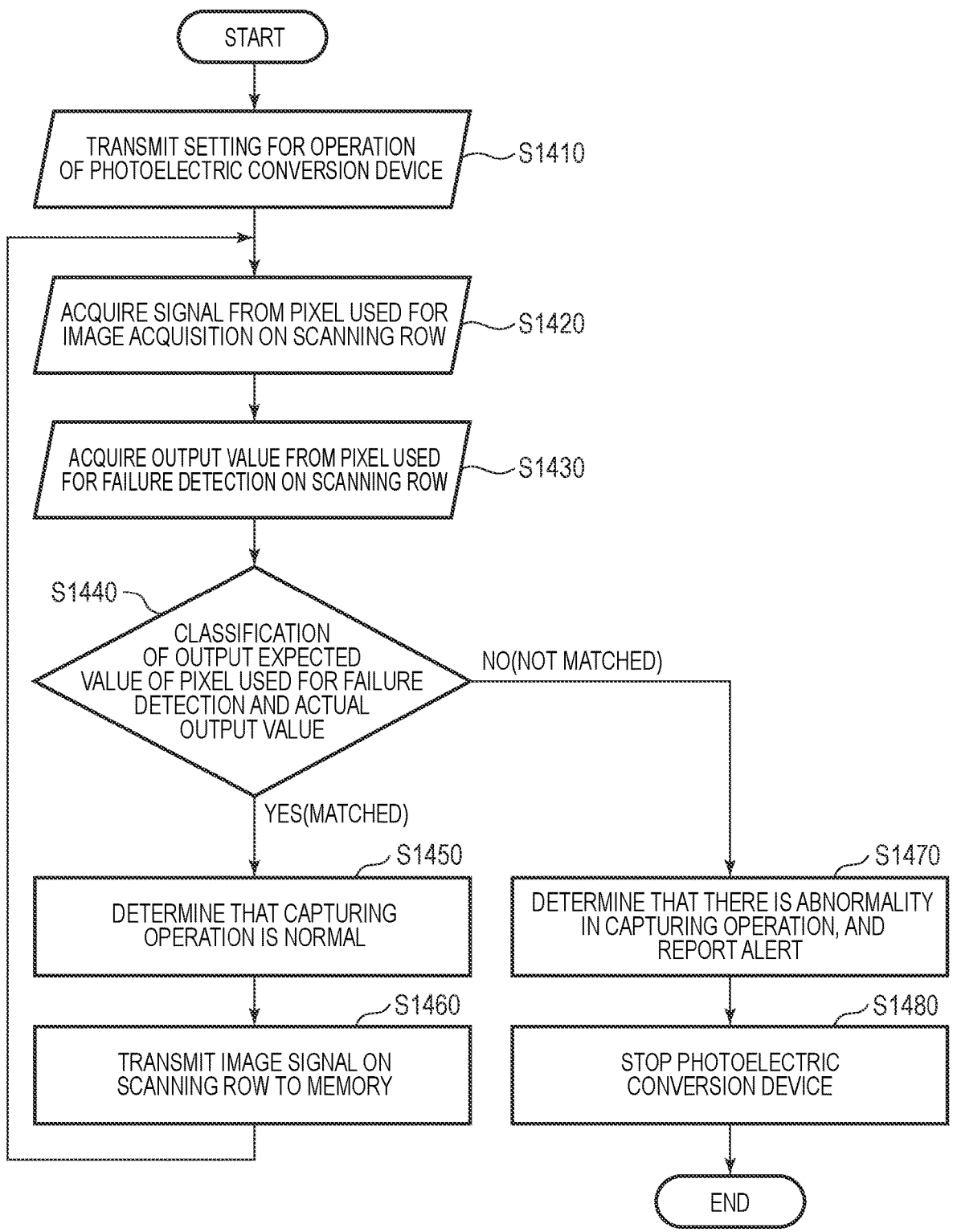
FIG. 18 illustrates a flowchart showing the operation of the light detection system according to the sixth embodiment.

Next, a failure detection operation of the photoelectric conversion device 1302 in the light detection system 1301 will be described with reference to FIG. 18. FIG. 18 is a flowchart illustrating an operation of the light detection system according to the present embodiment. The failure detection operation of the photoelectric conversion device 1302 may be performed according to steps S1410 to S1480 illustrated in FIG. 18.

In step S1410, the setting at the time of startup of the photoelectric conversion device 1302 is performed. That is, setting information for the operation of the photoelectric conversion device 1302 is transmitted from the outside of the light detection system 1301 (for example, the main control unit 1313) or the inside of the light detection system 1301, and the photoelectric conversion device 1302 starts an imaging operation and a failure detection operation.

Next, in step S1420, the photoelectric conversion device 1302 acquires pixel signals from the effective pixels. In step S1430, the photoelectric conversion device 1302 acquires an output value from a failure detection pixel provided for failure detection. The failure detection pixel includes a photoelectric conversion element in the same manner as the effective pixel. A predetermined voltage is written to the photoelectric conversion element. The failure detection pixel outputs a signal corresponding to the voltage written in the photoelectric conversion element. Steps S1420 and S1430 may be executed in reverse order.

Next, in step S1440, the light detection system 1301 performs a determination of correspondence between the expected output value of the failure detection pixel and the actual output value from the failure detection pixel. If it is determined in step S1440 that the expected output value matches the actual output value, the light detection system 1301 proceeds with the process to step S1450, determines that the imaging operation is normally performed, and proceeds with the process to step S1460. In step S1460, the light detection system 1301 transmits the pixel signals of the scanning row to the storage medium 1305 and temporarily stores them. Thereafter, the process of the light detection system 1301 returns to step S1420 to continue the failure detection operation. On the other hand, as a result of the determination in step S1440, if the expected output value does not match the actual output value, the light detection system 1301 proceeds with the process to step S1470. In step S1470, the light detection system 1301 determines that there is an abnormality in the imaging operation, and issues an alert to the main control unit 1313 or the alert device 1312. The alert device 1312 causes the display unit to display that an abnormality has been detected. Then, in step S1480, the light detection system 1301 stops the photoelectric conversion device 1302 and ends the operation of the light detection system 1301.

Although the present embodiment exemplifies the example in which the flowchart is looped for each row, the flowchart may be looped for each plurality of rows, or the failure detection operation may be performed for each frame. The alert of step S1470 may be notified to the outside of the vehicle via a wireless network.

Further, in the present embodiment, the control in which the vehicle does not collide with another vehicle has been described, but the present embodiment is also applicable to a control in which the vehicle is automatically driven following another vehicle, a control in which the vehicle is automatically driven so as not to protrude from the lane, and the like. Further, the light detection system 1301 can be applied not only to a vehicle such as a host vehicle, but also to a movable body (movable apparatus) such as a ship, an aircraft, or an industrial robot. In addition, the present embodiment can be applied not only to a movable body but also to an apparatus utilizing object recognition such as an intelligent transport system (ITS). The photoelectric conversion device of the present disclosure may be a configuration capable of further acquiring various types of information such as distance information.

Seventh Embodiment

Figure 19A:
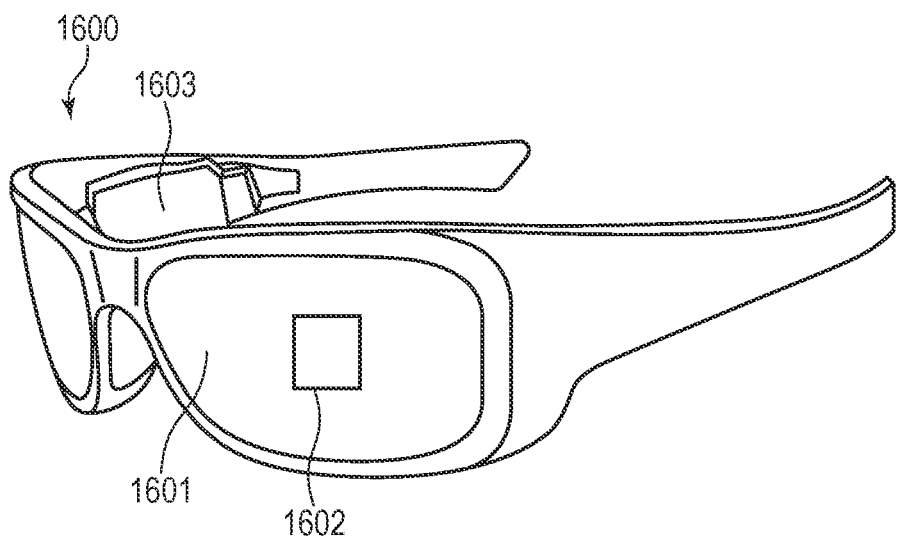
FIG. 19A illustrates a diagram showing a specific example of the electronic device according to the seventh embodiment.

FIG. 19A is a diagram illustrating a specific example of an electronic device according to the present embodiment. More specifically, FIG. 19A illustrates glasses 1600 (smart glasses). The glasses 1600 are provided with a photoelectric conversion device 1602 described in the above embodiments. That is, the glasses 1600 are an example of a light detection system to which the photoelectric conversion device 1602 described in each of the above embodiments can be applied. A display device including a light emitting device such as an OLED (Organic Light Emitting Diode) or an LED (Light Emitting Diode) may be provided on the back surface side of a lens 1601. One photoelectric conversion device 1602 may be provided, or multiple photoelectric conversion devices 1602 may be provided. Further, multiple types of photoelectric conversion devices may be combined. The arrangement position of the photoelectric conversion device 1602 is not limited to that illustrated in FIG. 19A.

The glasses 1600 further comprise a control device 1603. The control device 1603 functions as a power source for supplying power to the photoelectric conversion device 1602 and the above-described display device. The control device 1603 controls operations of the photoelectric conversion device 1602 and the display device. The lens 1601 is provided with an optical system for collecting light to the photoelectric conversion device 1602.

Figure 19B:
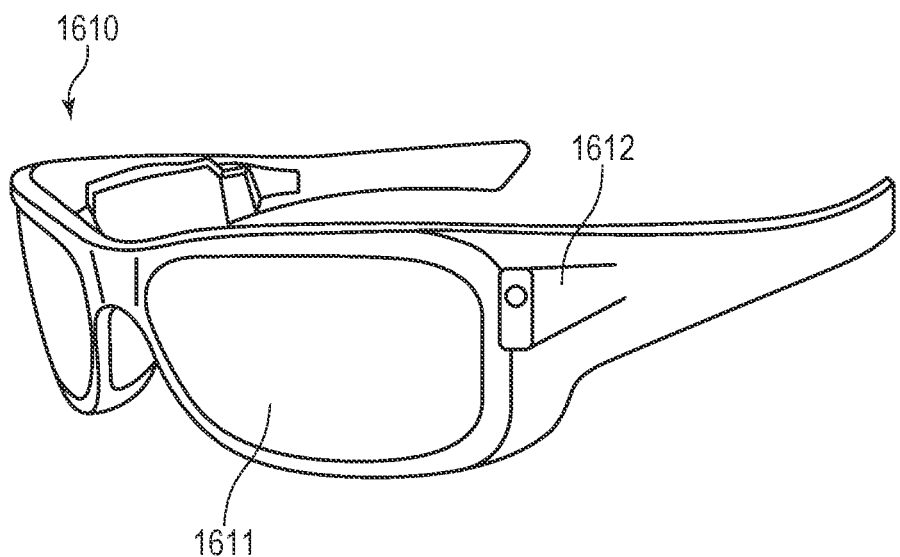
FIG. 19B illustrates a diagram showing a specific example of the electronic device according to the seventh embodiment.

FIG. 19B illustrates glasses 1610 (smart glasses) according to one application example. The glasses 1610 include a control device 1612, and a photoelectric conversion device corresponding to the photoelectric conversion device 1602 and a display device are mounted on the control device 1612. A lens 1611 is provided with a photoelectric conversion device in the control device 1612 and an optical system for projecting light emitted from a display device, and an image is projected on the lens 1611. The control device 1612 functions as a power source for supplying power to the photoelectric conversion device and the display device, and controls operations of the photoelectric conversion device and the display device. The control device 1612 may include a line-of-sight detection unit that detects the line of sight of the wearer. Infrared radiation may be used to detect the line of sight. The infrared light emitting unit emits infrared light to the eyeball of the user who is watching the display image. The reflected light of the emitted infrared light from the eyeball is detected by an imaging unit having a light receiving element, whereby a captured image of the eyeball is obtained. A reduction unit that reduces light from the infrared light emitting unit to the display unit in a plan view may be employed and the reduction unit reduces a degradation in image quality.

The control device 1612 detects the line of sight of the user with respect to the display image from the captured image of the eyeball obtained by imaging the infrared light. Any known method can be applied to the line-of-sight detection using the captured image of the eyeball. As an example, a line-of-sight detection method based on a Purkinje image due to reflection of irradiation light at a cornea can be used.

More specifically, a line-of-sight detection process based on a pupil cornea reflection method is performed. By using the pupil cornea reflection method, a line-of-sight vector representing a direction (rotation angle) of the eyeball is calculated based on the image of the pupil included in the captured image of the eyeball and the Purkinje image, whereby the line-of-sight of the user is detected.

The display device of the present embodiment may include a photoelectric conversion device having a light receiving element, and may control a display image of the display device based on line-of-sight information of the user from the photoelectric conversion device.

Specifically, the display device determines a first view field region gazed by the user and a second view field region other than the first view field region based on the line-of-sight information. The first view field region and the second view field region may be determined by a control device of the display device, or may be determined by an external control device. In the display area of the display device, the display resolution of the first view field region may be controlled to be higher than the display resolution of the second view field region. That is, the resolution of the second view field region may be lower than that of the first view field region.

The display area may include a first display region and a second display region different from the first display region. A region having a high priority may be determined from the first display region and the second display region based on the line-of-sight information. The first view field region and the second view field region may be determined by a control device of the display device, or may be determined by an external control device. The resolution of the high priority area may be controlled to be higher than the resolution of the region other than the high priority region. That is, the resolution of a region having a relatively low priority can be reduced.

It should be noted that an artificial intelligence (AI) may be used in determining the first view field region and the region with high priority. The AI may be a model configured to estimate an angle of a line of sight and a distance to a target on the line-of-sight from an image of an eyeball, and the AI may be trained using training data including images of an eyeball and an angle at which the eyeball in the images actually gazes. The AI program may be provided in either a display device or a photoelectric conversion device, or may be provided in an external device. When the external device has the AI program, the AI program may be transmitted from a server or the like to a display device via communication.

When the display control is performed based on the line-of-sight detection, the present embodiment can be preferably applied to smart glasses which further includes a photoelectric conversion device for capturing an image of the outside. The smart glasses can display captured external information in real time.

OTHER EMBODIMENTS

It should be noted that any of the above-described embodiments is merely an example of an embodiment for implementing the present disclosure, and the technical scope of the present disclosure should not be construed as being limited thereto. That is, the present disclosure can be implemented in various forms without departing from the technical idea or the main features thereof.

It is an object of the present disclosure to provide a photoelectric conversion device, a light detection system, a movable body, and a control method of the photoelectric conversion device that allows to improve the quality of captured images.

The present disclosure allows to provide a photoelectric conversion device, a light detection system, a movable body, and a control method of the photoelectric conversion device capable of improving the image quality of captured images.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-068436 filed on Apr. 19, 2023, which is hereby incorporated by reference herein in its entirety.

What is claimed is:

1. A photoelectric conversion device comprising:
   a detector that generates a change in voltage by a current generated in response to an incident photon;
   a switch arranged between the detector and a power node, the switch supplying a current for the detector from the power node to change a voltage of the detector to a predetermined bias voltage when being in an ON state, the switch cutting off the current supplied from the power node to the detector when being in an OFF state;
   a first circuit that generates a first detection signal based on the change in voltage in response to the incident photon in the detector during a period when the switch is in the ON state;
   a second circuit that generates a second detection signal based on the change in voltage in the detector during periods when the switch is in the ON state and in the OFF state;
   a counter that counts the detection signal to output a count value; and
   a selector that selects the first detection signal generated by the first circuit or the second detection signal generated by the second circuit and output a selected detection signal to the counter.

2. The photoelectric conversion device according to claim 1, wherein the first circuit does not generate the detection signal based on the change in voltage in the detector during the period when the switch is in the OFF state.

3. The photoelectric conversion device according to claim 1, wherein the selector selects the detection signal based on the count value.

4. The photoelectric conversion device according to claim 3,
   wherein the selector selects the detection signal generated by the first circuit in a case where the count value is equal to or more than a first value, and wherein the selector selects the detection signal generated by the second circuit in a case where the count value is less than a second value that is smaller than the first value.

5. The photoelectric conversion device according to claim 4, wherein the selector keeps selecting one of the first detection signal and the second detection signal, that has been previously selected in a case where the count value is less than the first value and greater than the second value.

6. The photoelectric conversion device according to claim 1, wherein the first circuit outputs the detection signal during the period when the switch is in the ON state and the OFF state, the detection signal being generated based on the voltage of the detector during the period when the switch is in the ON state.

7. The photoelectric conversion device according to claim 1, wherein the second circuit outputs the detection signal during the period when the switch is in the OFF state, the detection signal being generated based on the voltage of the detector during the period when the switch is in the ON state and the OFF state.

8. The photoelectric conversion device according to claim 1, wherein the detector includes a single photon avalanche diode (SPAD).

9. The photoelectric conversion device according to claim 1, further comprising a plurality of pixels arranged in a matrix form,
wherein each of the plurality of pixels includes the detector, the switch, the first circuit, the second circuit, and the counter,
wherein the selector selects the detection signal generated by the first circuit in a case where the number of the pixels outputting the count value greater than a first threshold value is equal to or greater than a first number, and
wherein the selector selects the detection signal generated by the second circuit in a case where the number of the pixels outputting the count value less than a second threshold value is equal to or greater than a second number, the second threshold value being smaller than the first threshold value.

10. The photoelectric conversion device according to claim 9, wherein the selector keeps selecting the detection signal that has been previously selected in a case where:
the number of the pixels outputting the count value greater than the first threshold value is less than the first number, and
the number of the pixels outputting the count value equal to or less than the second threshold value is less than the second number.

11. The photoelectric conversion device according to claim 9, wherein the selector selects the detection signal based on the count value in at least one previous frame.

12. The photoelectric conversion device according to claim 1, wherein the selector selects the detection signal based on the amount of incident light measured by a light amount sensor.

13. A light detection system comprising:
the photoelectric conversion device according to claim 1; and
a signal processing device that processes an image signal output from the photoelectric conversion device.

14. The light detection system according to claim 13, wherein the signal processing device generates a distance image indicating distance information to an object based on the image signal.

15. A movable body comprising:
the photoelectric conversion device according to claim 1;
a distance information acquisition unit that acquires distance information to an object based on an image signal output from the photoelectric conversion device; and
a controller that controls the movable body based on the distance information.

16. A method of controlling a photoelectric conversion device including a detector and a switch arranged between the detector and a power node, the method comprising:
generating, in the detector, a change in voltage by a current generated in response to an incident photon;
supplying a current for the detector from the power node to change a voltage of the detector to a predetermined bias voltage when the switch is in an ON state;
cutting off the current supplied from the power node to the detector when the switch is in an OFF state;
generating a detection signal based on the change in voltage in response to the incident photon in the detector; and
counting the detection signal to output a count value,
wherein the generating the detection signal includes:
generating the detection signal based on the change in voltage in the detector during a period when the switch is in the ON state; and
generating the detection signal based on the change in voltage in the detector during periods when the switch is in the ON state and in the OFF state.

* * * * *